US010979747B2

(12) United States Patent
Van Veldhuisen

(10) Patent No.: US 10,979,747 B2
(45) Date of Patent: Apr. 13, 2021

(54) STATISTICAL MULTIPLEXING SYSTEM FOR VARIABLE BIT RATE ENCODING WITH CONSTANT BIT RATE ENCODER

(71) Applicant: ARRIS Enterprises LLC, Suwanee, GA (US)

(72) Inventor: Brenda Van Veldhuisen, Portland, OR (US)

(73) Assignee: ARRIS Enterprises LLC, Suwanee, GA (US)

(*) Notice: Subject to any disclaimer, the term of this patent is extended or adjusted under 35 U.S.C. 154(b) by 42 days.

(21) Appl. No.: 15/851,736

(22) Filed: Dec. 21, 2017

(65) Prior Publication Data

US 2019/0200053 A1    Jun. 27, 2019

(51) Int. Cl.
| | | |
|---|---|---|
| H04N 21/2365 | (2011.01) | |
| H04N 21/2662 | (2011.01) | |
| H04N 21/234 | (2011.01) | |
| H04N 21/2343 | (2011.01) | |
| H04N 19/159 | (2014.01) | |
| H04N 19/115 | (2014.01) | |
| H04N 19/172 | (2014.01) | |
| H04N 19/152 | (2014.01) | |
| H04N 19/177 | (2014.01) | |
| H04N 19/15 | (2014.01) | |
| H04N 19/142 | (2014.01) | |

(52) U.S. Cl.
CPC ..... *H04N 21/23655* (2013.01); *H04N 19/115* (2014.11); *H04N 19/152* (2014.11); *H04N 19/159* (2014.11); *H04N 19/172* (2014.11); *H04N 19/177* (2014.11); *H04N 21/2343* (2013.01); *H04N 21/2365* (2013.01); *H04N 21/23406* (2013.01); *H04N 21/2662* (2013.01); *H04N 19/142* (2014.11); *H04N 19/15* (2014.11)

(58) Field of Classification Search
None
See application file for complete search history.

(56) References Cited

U.S. PATENT DOCUMENTS

| | | | | |
|---|---|---|---|---|
| 5,642,165 | A * | 6/1997 | Suzuki | H04N 19/176 375/240.02 |
| 6,574,274 | B2 * | 6/2003 | Obata | H04N 19/159 348/416.1 |
| 9,083,971 | B2 | 7/2015 | Van Veldhuisen et al. | |

(Continued)

FOREIGN PATENT DOCUMENTS

WO    00/45606 A1    8/2000

OTHER PUBLICATIONS

PCT International Search Report & Written Opinion, RE: Application No. PCT/US2018/062212, dated Jan. 30, 2019.

*Primary Examiner* — Mohammad J Rahman
(74) *Attorney, Agent, or Firm* — Chernoff, Vilhauer, McClung & Stenzel, LLP

(57) ABSTRACT

A statistical multiplexer (statmux) system for encoding multiple channels of digital television data is provided with improved algorithms for determining bitrate for encoding and decoding to account for signal complexity. The variable bit rate (VBR) encoders and encoding are provided in a statmux system by employing a CBR (constant bit rate) adapter. A CBR adapter can provide correcting state updates on a per-frame basis to a CBR encoder element, thereby enabling VBR capability.

16 Claims, 25 Drawing Sheets

(56) References Cited

U.S. PATENT DOCUMENTS

| | | | |
|---|---|---|---|
| 2003/0012275 A1* | 1/2003 | Boice | H04N 5/145 375/240.01 |
| 2003/0031251 A1* | 2/2003 | Koto | H04N 19/159 375/240.03 |
| 2003/0081631 A1* | 5/2003 | Liu | H04N 21/4347 370/468 |
| 2004/0208378 A1* | 10/2004 | Hashimoto | H04N 19/62 382/232 |
| 2005/0018919 A1* | 1/2005 | Shiraishi | H04N 19/91 382/254 |
| 2006/0018254 A1* | 1/2006 | Sanders | H04N 21/23655 370/216 |
| 2006/0034369 A1* | 2/2006 | Mohsenian | H04N 19/103 375/240.03 |
| 2006/0159169 A1* | 7/2006 | Hui | H04N 19/176 375/240.03 |
| 2007/0064816 A1* | 3/2007 | Chiang | H04N 19/139 375/240.29 |
| 2007/0071094 A1* | 3/2007 | Takeda | H04N 19/197 375/240.04 |
| 2009/0245384 A1* | 10/2009 | Fukuhara | H04N 19/647 375/240.24 |
| 2012/0151542 A1* | 6/2012 | Shafrir | H04N 21/2381 725/109 |
| 2014/0059167 A1* | 2/2014 | Gopalan | H04N 21/2662 709/217 |
| 2014/0112384 A1 | 4/2014 | Van Veldhuisen et al. | |
| 2014/0112385 A1 | 4/2014 | Van Veldhuisen et al. | |
| 2014/0112386 A1 | 4/2014 | Van Veldhuisen et al. | |
| 2015/0341632 A1* | 11/2015 | Syed | H04N 19/0006 375/240.03 |
| 2016/0301935 A1 | 10/2016 | McCarthy | |
| 2020/0128253 A1* | 4/2020 | Zhou | H04N 19/152 |

* cited by examiner

STATISTICAL MULTIPLEXING SYSTEM FOR VARIABLE BIT RATE ENCODING WITH CONSTANT BIT RATE ENCODER

BACKGROUND

Technical Field

The present invention relates to a statistical multiplexer for coding and multiplexing multiple channels of digital television data.

Related Art

Digital television has become increasingly popular due to the high quality video image it provides, along with informational and entertainment features, such as pay-per-view, electronic program guides, Internet hyperlinks, and so forth. Such television data can be communicated to a user, for example, via a broadband communication network, such as a satellite or cable television network, or via a computer network. The video data can include high definition (HD) and standard-definition (SD) television (TV).

However, due to the bandwidth limitations of the communication channel, it is necessary to adjust a bit rate of the digital video programs that are encoded and multiplexed for transmission in a single compressed bit stream. A goal of such bit rate adjustment is to meet the constraint on the total bit rate of the multiplexed stream, while also maintaining a satisfactory video quality for each program.

Accordingly, various statistical multiplexers have been developed that evaluate statistical information of the source video that is being encoded, and allocate bits for coding the different video channels. For example, video channels that have hard-to-compress video, such as a fast motion scene, can be allocated more bits, while channels with relatively easy to compress scenes, such as scenes with little motion, can be allocated fewer bits.

In MPEG-2 and MPEG-4 digital video systems, the complexity of a video frame can be measured by the product of the quantization level (QL) used to encode that frame and the number of bits used for coding the frame (R). Thus the complexity of a frame becomes known after it has been encoded. As a result, the complexity information lags behind the actual encoding process, which requires the buffering of a number of frames prior to encoding, thereby adding expense and complexity. This kind of look-behind information may be avoided by using some pre-encoding statistics about the video, such as motion estimation (ME) scores or a need parameter (NP) to provide a complexity measure. However, the relationship between the pre-encoding statistics of a video frame and the complexity of that frame may not be direct, and sometimes the relationship may change due to the changing subject matter of the source video.

Previous statistical multiplexing systems employed a number of individual encoders that encode data from a number of incoming channels of source video data. Such systems dynamically allocated bits to the individual encoders to encode frames of video data from the channels. The systems used pre-encoding statistics of the source video frames that are closely related to the complexity of the frames, and account for changing content in the source video, to dynamically allocate bits. With more channels included in video content and increasing density of the data in high density systems it is desirable to continue to improve the performance of such multiplexing systems.

SUMMARY

Embodiments of the present invention provide improvements to a statistical multiplexer (statmux) system for encoding and decoding multiple channels of digital television data. Systems and methods can provide improved algorithms to better determine bit rate by identifying film mode and group of picture (GOP) structural changes.

A film mode provides a lower frame per second rate of 24 frames per second fps, as compared to SD (standard definition) at 30 fps, or 720p HD (high definition) at 60 fps. The non-film SD and HD modes can provide a ratio of 3:2 which can readily be managed to control bit rate, unlike film mode. Thus, in film mode when the 24 fps rate is detected, instead of determining bit rate from simply viewing the next picture in a look ahead buffer (LAB) as conventionally done for SD and HD modes, a system can look at a start time stamp of specific data in the LAB to better determine the data rate when in film mode.

Accounting for GOP structural changes can include identifying the number of pictures N and M. The number N refers to the number of pictures between I type pictures in data provided to an encoder. The number (M) refers to the number of pictures between P type pictures. N technically references the size of a GOP, while N references the size of a sub-group within the GOP, In previous systems, a fixed number was used to estimate N and M. In the present system to better account for GOP structural changes and determine bit rate, the actual numbers for N and M can be determined.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a statistical multiplexing system including: one or more variable rate (VBR) encoders, each VBR encoder including a corresponding multiplexer, a corresponding constant bit rate (CBR) encoder, and a corresponding CBR adapter, where the CBR encoder is configured to. The statistical multiplexing system also includes encode sequenced input frames of a video data source thereby providing encoded output frames, and. The statistical multiplexing system also includes provide need parameter data; and. The statistical multiplexing system also includes a statistical multiplexer (statmux) controller configured to receive the need parameter data from each CBR encoder, and, provide a corresponding bitrate queue to each corresponding CBR adapter responsive to the need parameter data where. The statistical multiplexing system also includes the bitrate queue includes indexed controller time intervals and bits values respectively corresponding to the indexed controller time intervals, and. The statistical multiplexing system also includes frame intervals corresponding to the video data source are asynchronous to, and substantially larger than, the controller time intervals. The statistical multiplexing system also includes where each multiplexer is configured to receive the encoded output frames, provide packetized compressed output responsive to the encoded output frames and according to a corresponding bitrate queue, and, provide performance feedback per each encoded output frame to the CBR adapter. The statistical multiplexing system also includes where each CBR encoder includes a constant bit rate (CBR) video buffering verifier (vbv) model, and, is further configured to receive a state update for each input frame, perform encoding of each input frame responsive to the state update, the state update including a vbv model correction including a bit rate update, and, provide encode statistics corresponding to the encoding of each input frame; and. The statistical multiplexing system also includes where each CBR adapter includes an adapter VBV model, and, is configured to receive a corresponding bitrate queue from the statmux controller, receive performance feedback from the corresponding multiplexer, receive encode statistics from the corresponding CBR encoder, update the adapter VBV model responsive to the corresponding bitrate queue, the performance feedback, and the encode statistics, and, provide the corresponding CBR encoder with a state update corresponding to encoding of an input frame, the state update including a vbv model correction including a bit rate update. Other embodiments of this aspect include corresponding computer systems, apparatus, and computer programs recorded on one or more computer storage devices, each configured to perform the actions of the methods.

Implementations may include one or more of the following features. The system where. The system may also include the encode statistics include a PTS (presentation time stamp) and a measure of bits used for each encoded frame. The system where. The system may also include the CBR adapter computes a bit rate for each input frame, and. The system may also include the bit rate for each input frame is computed by integrating bitrate queue bits values corresponding to controller time intervals proximate to a presentation time stamp (PTS) corresponding to the input frame. The system where. The system may also include the CBR adapter is configured to update the adapter VBV model for the encoding of each input frame, and, provide a model correction for the CBR VBV model responsive to the updated adapter VBV model. The system where. The system may also include the adapter VBV model further includes a VBV buffer, input frames disposed within the VBV buffer, and, a corresponding maximum VBV buffer size value and a corresponding maximum VBV buffer delay value for each input frame in the VBV buffer. The system may also include where the maximum VBV buffer size value and the maximum VBV buffer delay value are computed from user specified parameters, a presentation time stamp (PTS) corresponding to the input frame in the VBV buffer, bitrate queue time interval values, and bitrate queue bits values respectively corresponding to the bitrate queue time interval values. The system where. The system may also include the user specified parameters include a maximum buffer size and a maximum buffer delay, both corresponding to a specific encoding profile. The system where. The system may also include the user specified parameters include a maximum buffer size and a maximum buffer delay, both corresponding to a user specification. The system where. The system may also include the adapter VBV model further includes an input frame buffer, input frames disposed within the input frame buffer, a current vbv level, an output buffer, and, output frames disposed within the output buffer; and. The system may also include the current vbv level represents a count of bits available in the output buffer at a time just prior to encoding a next frame from the input frame buffer; and. The system may also include the current vbv level is computed from performance feedback corresponding to a most recently placed frame in the output buffer, encode statistics corresponding to previously encoded frames, the bitrate queue, and, a presentation time stamp (PTS) corresponding to the next frame from the input frame buffer that is to be encoded. The method where. The method may also include the encode statistics include a PTS (presentation time stamp) and a measure of bits used for each encoded frame. The method further including the steps of: computing a bit rate for each input frame, where the bit rate for each input frame is computed by integrating bitrate queue bits values corresponding to controller time intervals proximate to a presentation time stamp (PTS) corresponding to the input frame. The method further including the steps of: updating the adapter VBV model for the encoding of each input frame; and, providing a model correction for the CBR VBV model responsive to the updated adapter VBV model. The method where. The method may also include the adapter VBV model further includes a VBV buffer, input frames disposed within the VBV buffer, and, a corresponding maximum VBV buffer size value and a corresponding maximum VBV buffer delay value for each input frame in the VBV buffer. The method may also include where the maximum VBV buffer size value and the maximum VBV buffer delay value are computed from user specified parameters, a presentation time stamp (PTS) corresponding to the input frame in the VBV buffer, bitrate queue time interval values, and bitrate queue bits values respectively corresponding to the bitrate queue time interval values. The method where. The method may also include the user specified parameters include a maximum buffer size and a maximum buffer delay, both corresponding to a specific encoding profile. The method where. The method may also include the user specified parameters include a maximum buffer size and a maximum buffer delay, both corresponding to a user specification. The method where. The method may also include the adapter VBV model further includes an input frame buffer, input frames disposed within the input frame buffer, a current vbv level, an output buffer, and, output frames disposed within the output buffer; and. The method may also include the current vbv level represents a count of bits available in the output buffer at a time just prior to encoding a next frame from the input frame buffer; and. The method may also include the current vbv level is computed from performance feedback corresponding to a most recently placed frame in the output buffer, encode statistics corresponding to previously encoded frames, the bitrate queue, and, a presentation time stamp (PTS) corresponding to the next frame from the input frame buffer that is to be encoded. Implementations of the described techniques may include hardware, a method or process, or computer software on a computer-accessible medium.

One general aspect includes a statistical multiplexing method including the steps of: encoding sequenced input frames of a video data source thereby providing encoded output frames, and, need parameter data; providing a corresponding bitrate queue responsive to the need parameter data where. The statistical multiplexing method also includes the bitrate queue includes indexed controller time intervals and bits values respectively corresponding to the indexed controller time intervals, and. The statistical multiplexing method also includes frame intervals corresponding to the video data source are asynchronous to, and substantially larger than, the controller time intervals. The statistical multiplexing method also includes providing packetized compressed output responsive to the encoded output frames and according to the corresponding bitrate queue. The statistical multiplexing method also includes providing performance feedback per each encoded output frame. The statistical multiplexing method also includes providing a constant bit rate (CBR) video buffering verifier (vbv) model. The statistical multiplexing method also includes receiving a state update for each input frame. The statistical multiplexing method also includes performing encoding of each input frame responsive to the state update and the CBR VBV model. The statistical multiplexing method also includes providing encode statistics corresponding to the encoding of each input frame. The statistical multiplexing method also includes providing an adapter VBV model. The statistical multiplexing method also includes updating the adapter VBV model responsive to the corresponding bitrate queue, the performance feedback, and the encode statistics; and. The statistical multiplexing method also includes providing the state update corresponding to encoding of an input frame, the state update including a vbv model correction including a bit rate update. Other embodiments of this aspect include corresponding computer systems, apparatus, and computer programs recorded on one or more computer storage devices, each configured to perform the actions of the methods.

Implementations may include one or more of the following features. The method where. The method may also include the encode statistics include a PTS (presentation time stamp) and a measure of bits used for each encoded frame. The method further including the steps of: computing a bit rate for each input frame, where the bit rate for each input frame is computed by integrating bitrate queue bits values corresponding to controller time intervals proximate to a presentation time stamp (PTS) corresponding to the input frame. The method further including the steps of: updating the adapter VBV model for the encoding of each input frame; and, providing a model correction for the CBR VBV model responsive to the updated adapter VBV model. The method where. The method may also include the adapter VBV model further includes a VBV buffer, input frames disposed within the VBV buffer, and, a corresponding maximum VBV buffer size value and a corresponding maximum VBV buffer delay value for each input frame in the VBV buffer. The method may also include where the maximum VBV buffer size value and the maximum VBV buffer delay value are computed from user specified parameters, a presentation time stamp (PTS) corresponding to the input frame in the VBV buffer, bitrate queue time interval values, and bitrate queue bits values respectively corresponding to the bitrate queue time interval values. The method where. The method may also include the user specified parameters include a maximum buffer size and a maximum buffer delay, both corresponding to a specific encoding profile. The method where. The method may also include the user specified parameters include a maximum buffer size and a maximum buffer delay, both corresponding to a user specification. The method where. The method may also include the adapter VBV model further includes an input frame buffer, input frames disposed within the input frame buffer, a current vbv level, an output buffer, and, output frames disposed within the output buffer; and. The method may also include the current vbv level represents a count of bits available in the output buffer at a time just prior to encoding a next frame from the input frame buffer; and. The method may also include the current vbv level is computed from performance feedback corresponding to a most recently placed frame in the output buffer, encode statistics corresponding to previously encoded frames, the bitrate queue, and, a presentation time stamp (PTS) corresponding to the next frame from the input frame buffer that is to be encoded. Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

I. Statmux System Overview

Figure 1:
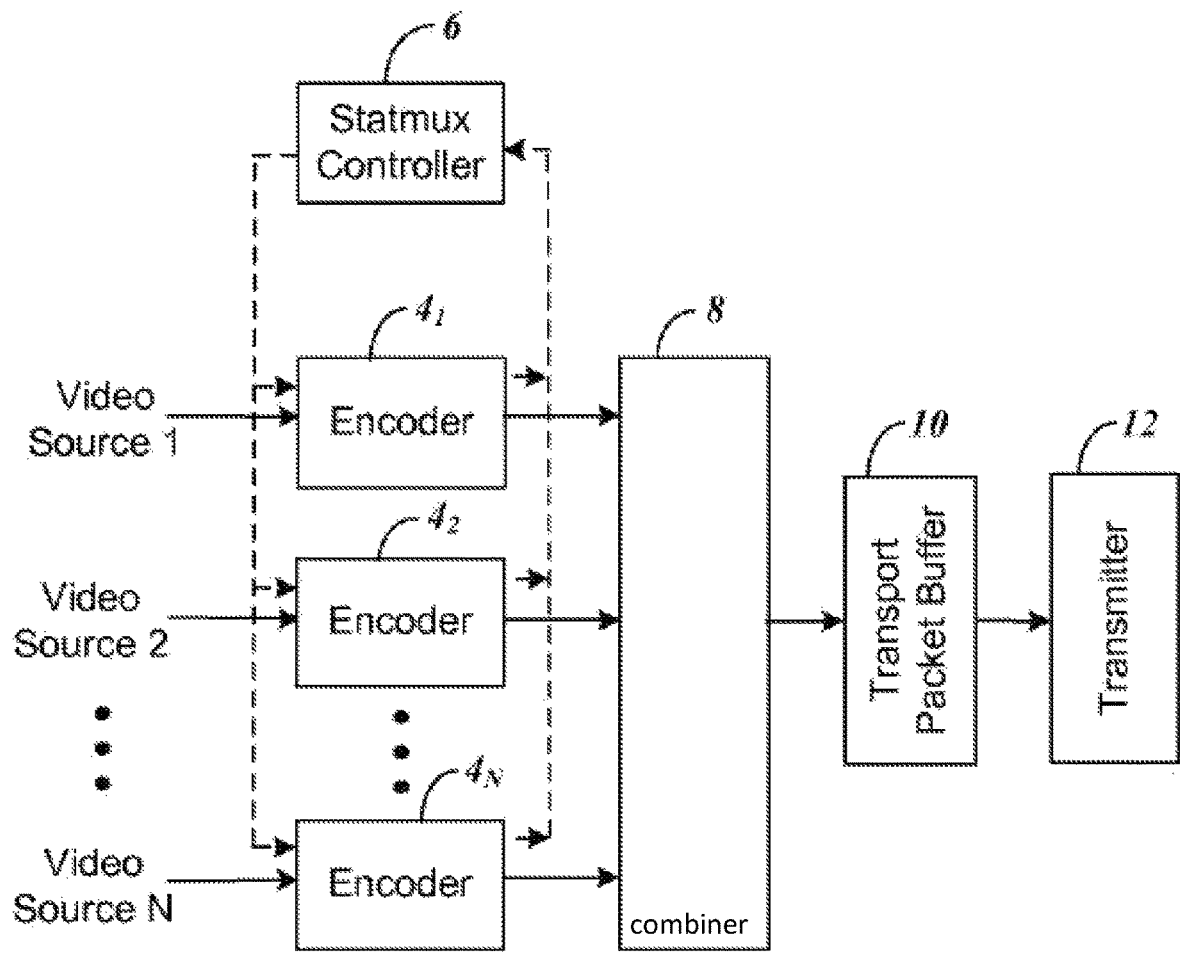
FIG. 1 is a block diagram illustrating a statistical multiplexer (statmux) system.

FIG. 1 is a block diagram illustrating a statistical multiplexer (statmux) system for encoding and multiplexing multiple channels of digital television data. The encoding system of FIG. 1 includes encoders $4_1$-$4_N$ that can receive corresponding uncompressed video source inputs 1-N. The encoders $4_1$-$4_N$ can provide need parameter (NP) data and clocking information to statmux controller 6, which in turn can provide a corresponding encoding bit rate allocation to each of the encoders $4_1$-$4_N$. The statmux controller 6 can include a rate control sequencer that provides a bit rate control signal to the encoders $4_1$-$4_N$ in order to allocate data to a combiner 8 in an efficient manner.

The encoded data provided to a combiner 8 can be combined into a single bitstream and received by transport packet buffer 10. Combiner 8 can comprise a multiplexing function. The transport packet buffer 10 can provide the compressed and multiplexed video channels to a transmitter 12. Transmitter 12 can transmit to a remote receiver that can decode and provide the individual channels to a television or other video display device.

II. Encoders

Figure 2:
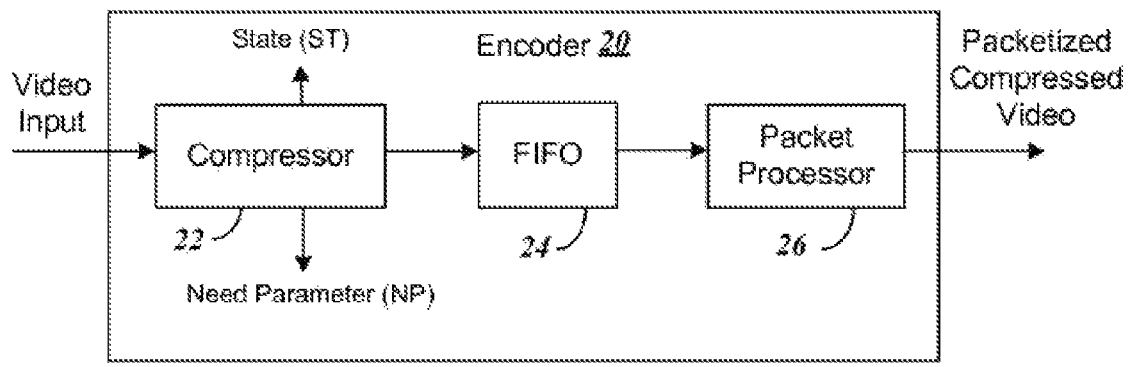
FIG. 2 shows a block diagram of components for an standard definition (SD) encoder.

Exemplary encoders $4_1$-$4_N$ are depicted in FIG. 1. In some embodiments, encoders $4_1$-$4_N$ can support standard definition (SD) television and/or high definition (HD) television. In some embodiments, additional and/or alternative streaming image formats can be supported. A block diagram of an exemplary encoder 20 embodiment is shown in FIG. 2. As shown, the encoder 20 can encode a single channel of SD video input data. Encoder 20 can comprise a compressor 22 that can perform conventional data compression, including motion compensation for P and B frames, discrete cosine transform (DCT) and quantization. A video first-in first-out (FIFO) buffer 24 can temporarily store compressed data. A packet processor 26 can form packets of the compressed data with appropriate header information according to MPEG-2, MPEG-4 or another video standard.

Figure 3:
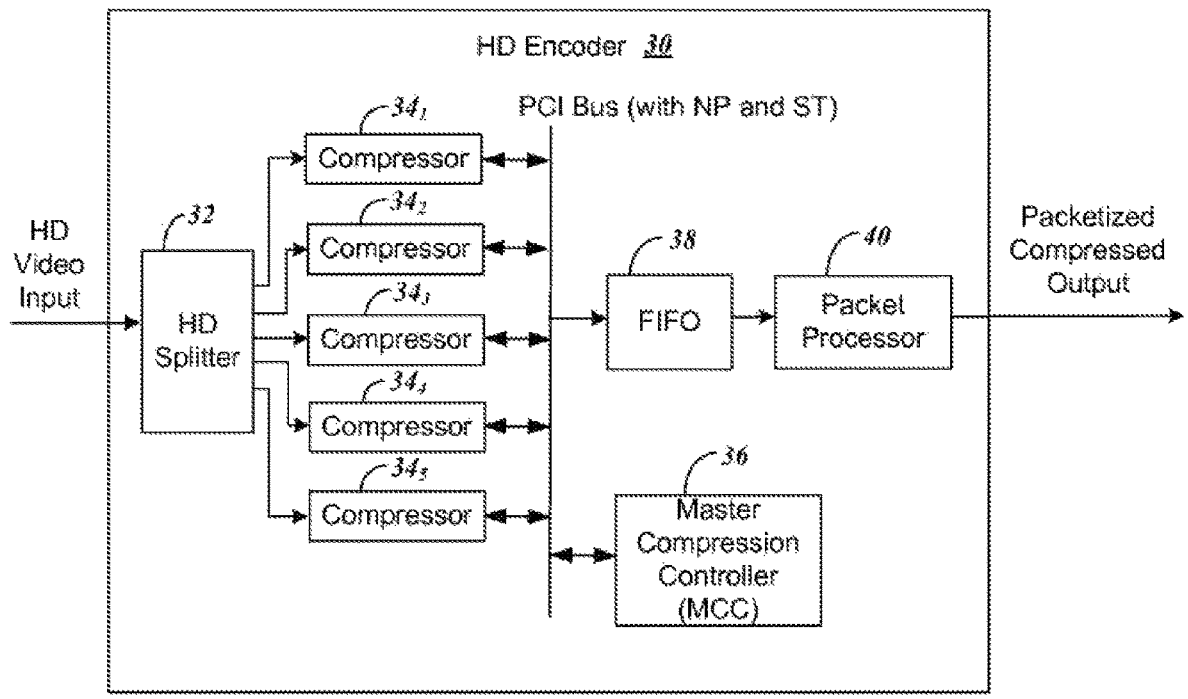
FIG. 3 shows a block diagram of components for a high definition (HD) encoder.

A block diagram of an exemplary HD encoder 30 embodiment is shown in FIG. 3. The HD encoder can encode a single channel of HD input video data. A splitter 32 can divide up a video frame such that different sub-regions, or panels, of the frame can be routed through multiple compressors, such as the five compressors $34_1$-$34_5$ shown. A master compression controller 36 (MCC) can control the compression of the data at each compressor $34_1$-$34_5$ via a peripheral component interconnect (PCI) bus. Compressed data can be output to a video FIFO 38 for temporary storage. The compressed data from FIFO 38 can be formed into packets for transport at a packet processor 40.

The encoders of FIG. 2 and FIG. 3, when connected in a system as shown in FIG. 1, can use information from the compressors to provide data such as a Need Parameter (NP). The encoders can receive data such as the State (ST). State (ST) can comprise bitrate control information that can be used to manage the output of the compressors. An encoding bit rate for multiple encoders can be determined by summing a NP for each of the compressors. The statmux controller 6 of FIG. 1 can employ the same information to control data output as does the MCC 36 of FIG. 3. Thus the MCC 36 of an HD buffer can be used in conjunction with the statmux controller 6, and/or the statmux controller 6 can be integrated with the MCC 36 as a single device.

Control information such as the NP and ST can be exchanged between encoders and statmux controller 6. Statmux controller 6 can provide a Bitrate Queue (BRQ) comprising control parameters for one or more encoders and/or additional elements of a system. A BRQ can comprise control parameters specific to individual encoders and/or additional elements of a system. Thus a BRQ can be employed for efficient control of a statmux system. For the NP, each encoder can provide NP information to the statmux controller 6 that can indicate the difficulty of the content being encoded. The statmux controller 6 can use this NP data to determine a ratio of bits to give each encoder. For ST, each encoder can receive state information from the statmux controller 6. This ST can be updated with the BRQ data at regular intervals, for example every 2 milliseconds. The ST information can comprise a minimum bitrate, nominal bitrate, and/or a command that can be set to hold the bitrate constant. A separate BRQ for each encoder can contain equally spaced bitrates to be applied. By way of example and not limitation, ins some embodiments the BRQ application period can be 2 milliseconds. In some example embodiments, substantially all PCI bus accesses by the statmux controller and encoders can be made via writes, thereby enhancing efficiency. In such embodiments, essentially no PCI reads are performed, so essentially all data can be stored at the destination. Further information about statistical data determination, such as NP and BRQ, are described in more detail to follow.

Figure 4:
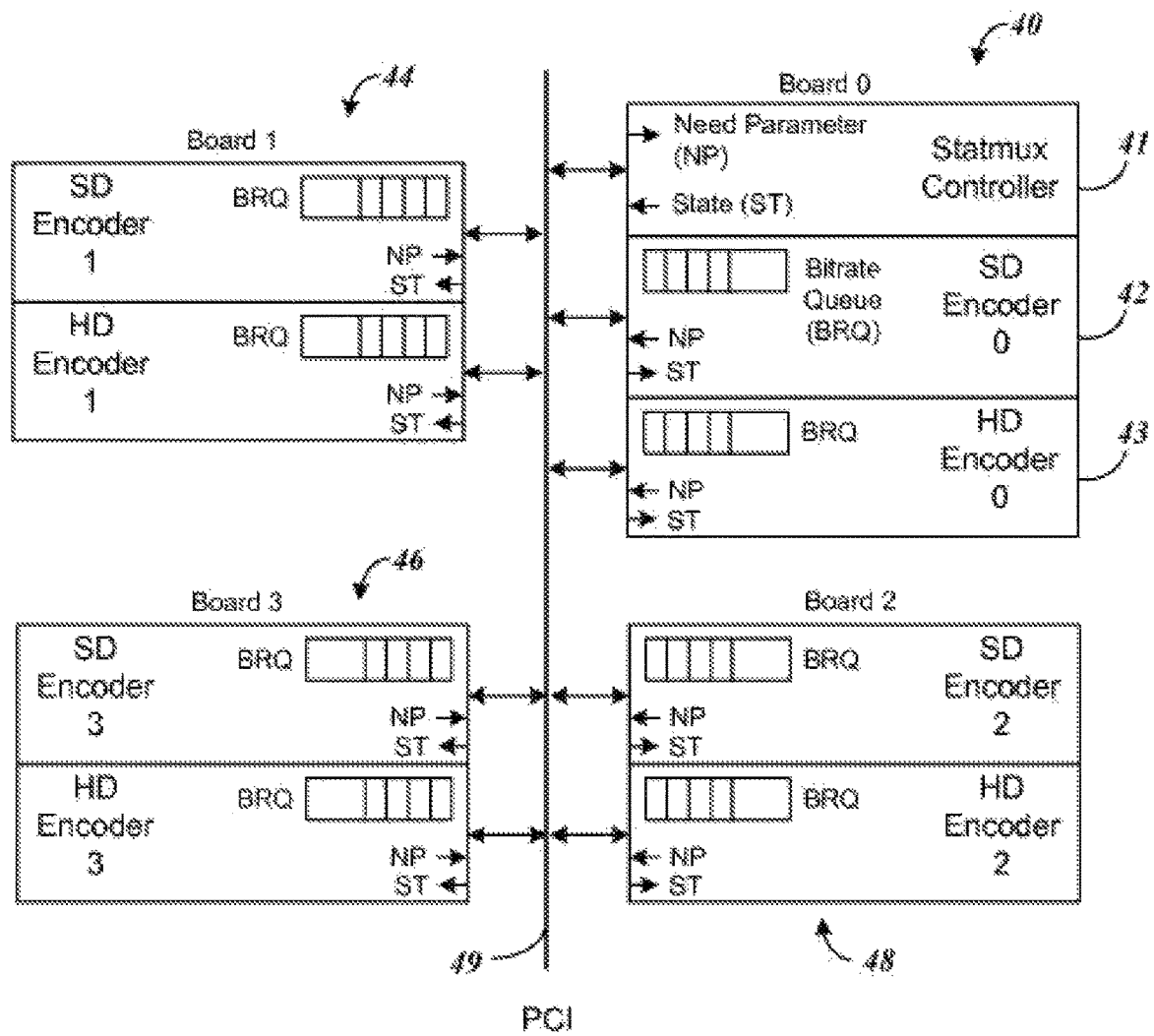
FIG. 4 shows an example of a board layout for a statmux system using both SD and HD encoders.

In some embodiments, SD and HD encoders can be combined into a single statmux system, such as that illustrated in FIG. 1. FIG. 4 shows an example of a circuit board layout for such a combined system. A printed circuit board 0 with label 40 can include a statmux controller 41, an SD encoder 42 and a HD encoder 43. The statmux controller 41 can receive NP information from each of the system encoders over a PCI bus 49. Statmux controller 41 can provide ST information to control the output of each encoder, thereby supporting the efficient combination of the outputs into a single bit stream. Encoder 42 can receive the ST information and provide NP data to the PCI bus 49 in order to enable control of the bit rate queue (BRQ) in its compressor. Encoder 43 can have multiple compressors. Similarly to the encoder 42, encoder 43 can receive ST information from the statmux controller 41 over the PCI bus 49 and can provide NP data to enable control of its BRQ. Such NP data can be formed from the combined output of the multiple compressors of encoder 43.

Some system embodiments, as depicted in FIG. 4, can further comprise additional boards 44, 46 and 48 that each likewise can comprise SD and/or HD encoders. Encoders on boards 44, 46 and 48 can communicate NP and ST data with the statmux controller 41. Thus a single data stream can be provided by combining the outputs of all encoders in the system in an efficient manner.

III. Need Parameter (NP)

Calculation of NP can be a key part of a statistically multiplexed multi-channel encoding system. The visual characteristics and complexity information regarding the source video can be collected and condensed into this single parameter, which is referred to as the "need parameter." In some embodiments, the NP can be calculated for each video channel, and can be updated once per frame whenever a new video frame is processed by an encoder. In some embodiments the NP can be updated more often, such as multiple times per frame. In some embodiments corresponding to a field-picture mode, NP can be updated once per field.

The current frame motion estimation (ME) scores, average frame ME scores and current frame activity can be directly applied in the calculation of the NP. Optionally, a table look-up may be used. The NP calculation functions in an encoder can provide the NP according to the current picture type in the beginning of a new frame (such as HD or SD), and can pass the NP to the statmux controller. In some embodiments, the NP is required to arrive at the statmux controller no later than, e.g., two quantization level/bit rate (QL/BR) cycles before the start of the slice encoding at the encoder. Such a lead time can ensure that the statmux controller has enough processing time for bandwidth allocation.

In some operational embodiments of a statmux system, such as illustrated in FIG. 1, each encoder can be assumed to provide a picture complexity measure to enable calculation of the NP, such as an ME score or activity level, to the statmux controller 6. This can enable the statmux controller to handle the tasks of allocating bandwidth for each television service provider (TSP), e.g., channel, and modulating the transmission rates for each channel. In some embodiments comprising an encoder with look ahead capability, the ME score can be replaced by other measurements such as the actual number of bits coded under a constant quantization level (QL).

In some embodiments of the high-definition encoder that processes multiple panels of a frame in parallel, such as illustrated in FIG. 3, the encoders $34_1$-$34_5$ can collect the ME scores from all the panels and compute the sum along with other parameters such as Average Pixel Level (APL), picture resolution, frame rate, frame type (I, B or P) and total intra-frame activity. The encoders can also keep records of the sizes and average QL for past frames. Based on the information available, plus the look ahead buffer parameters including scene change, fade and film detection, the statmux controller can derive a total NP for that video channel.

As the statmux controller 6 receives updated NP data, it can reallocate the respectively corresponding bandwidths for all the video services based on the latest information. The bandwidth allocation can be sent back to each encoder, such as $4_1$-$4_N$ of FIG. 1, in the form of an encoding bit rate or state ST. The encoders can use the ST bandwidth allocation to compute bit budgets for encoding for the bitrate queue (BRQ).

The statmux controller can maintain an approximate Video Buffering Verifier (VBV) model for each encoder, such as is well-known from MPEG standards, to ensure that each frame from each encoder can be encoded within acceptable size limits. Accuracy of the VBV model can be limited because the actual transmission rate changes that occur at the decode time of a frame are imprecisely modeled in advance, at the time of encoding. The statmux controller 6 can also keep a bit accurate model of the BRQ, and calculate the minimum and maximum limits on the transmission rate before any transmission rate change is issued. In general, the video services need not be mutually frame-synchronized. Thus encoding bit rates and transmission rates can be updated at a rate different from the native frame rates of the media streams. In some embodiments, a statmux controller 6 can advantageously provide updates at substantially higher rate than a video frame rate. By way of example and not limitation, in some embodiments the statmux controller update rate can be 500 Hz (2 msec) in the presence of 30 fps (33.33 msec) video streams.

IV. Bitrate and Timing Considerations

Figure 5:
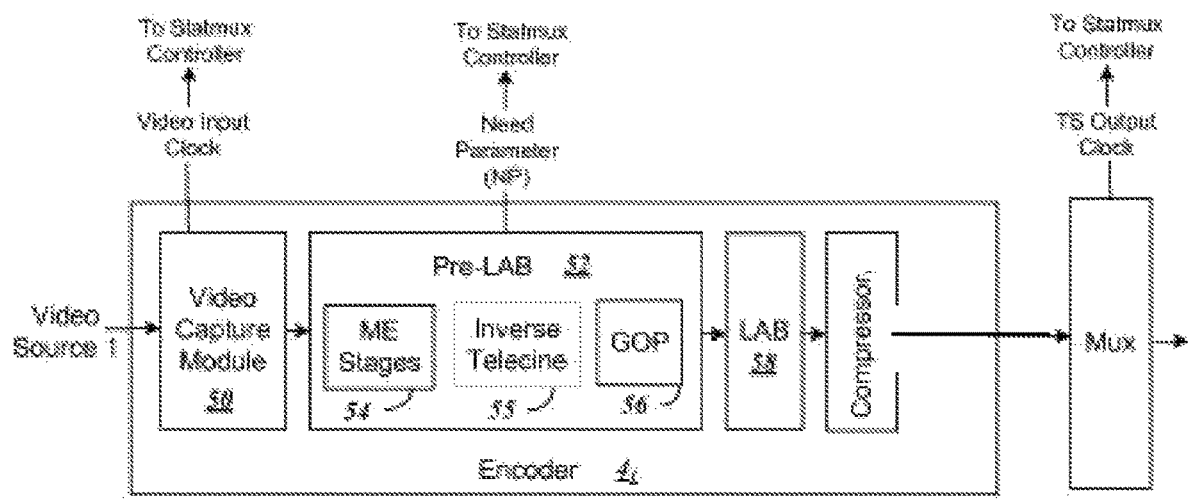
FIG. 5 shows details of components of an encoder of FIG. 1, along with its connection to the multiplexer of the statmux system, for purposes of illustrating timing data.

FIG. 5 shows further details of input components of an encoder of FIG. 1, along with its connection to the multiplexer (mux) 59, for purposes of illustration of timing data. For reference, FIG. 6 further provides a timing diagram to illustrate signals to and from the components of FIG. 5 and how those signals are interrelated.

Initially, the encoder $4_1$ includes a video capture module 50. The video capture module 50 can provide a Video Input Clock signal, illustrated in FIG. 5, to the statmux controller 6. In some embodiments, the video input clock can be generated from field interrupts in the video capture module 50.

The encoder $4_1$ can further include a Pre-Look Ahead Buffer (Pre-LAB) 52 that can receive the output of the video capture module 50. The PreLAB 52 can comprise a few pipeline stages before a frame is placed in the Look Ahead Buffer (LAB) 58. These stages can comprise some early Motion Estimation (ME) stages 54, Inverse Telecine stage 55 to transfer cinema signals to television, and/or the Group of Pictures (GOP) stage 56. The ME stage 54 can be provided in addition to the ME stage information from the compressor of the encoder $4_1$, and can be used to determine the NP that helps the statmux controller 6 determine bandwidth need for individual signals prior to encoding.

The output of the Pre-LAB 52 can be provided to the Look Ahead Buffer (LAB) 58. In some embodiments, the LAB 58 can buffer a fixed number of frames of storage, for example a fixed 30 frames, regardless of the input format. With a fixed 30 frames of storage, the clock timing of the LAB 58 can be different for 30 frames per second (fps) output than it is for 60 fps.

Figure 6:
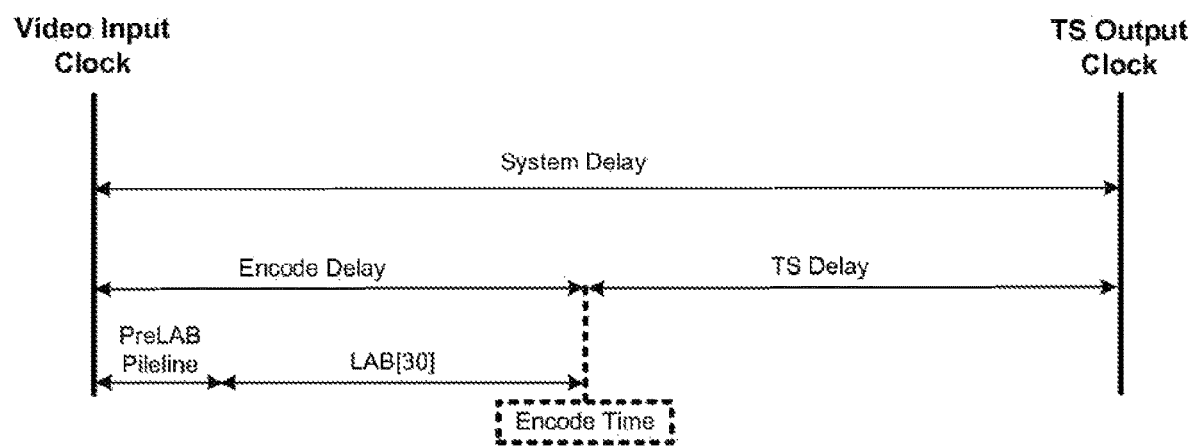
FIG. 6 provides a timing diagram to illustrate signals to and from the components of FIG. 5.

The output of the LAB 58 can be provided to the compressor and other components of the encoder $4_1$. The final output of encoder $4_1$ can then be provided to a multiplexer 59. The multiplexer 59 can provide a Transport Stream (TS) Output Clock that can clock the output packets from the multiplexer 59. The TS output clock, as shown in FIG. 6, can be synchronized to the video input clock by the video capture module 50, and can be set to the Program Clock Reference (PCR) time of the next packet to be generated by the multiplexer 59. As further illustrated in FIG. 6, the TS output clock can be offset from the video input clock by a total "System Delay." In some embodiments, System Delay remains essentially constant.

Other time references relative to the video input clock and the TS output clock are also illustrated in FIG. 6. First, the "Encode Delay" is defined as the delay between when the picture is captured to the time the picture is encoded by the encoder. The delay of the PreLAB pipeline 52 and LAB 58 together make up the total encode delay. The delay caused by the compressor is illustrated by the dotted lines in the box labeled "Encode Time" in FIG. 6. Finally, a "TS Delay" is the portion of the system delay that does not include the encode delay or encode time. The TS delay can be described as the time difference between the Presentation Time Stamp (PTS) of the frame to be encoded and the TS Output Clock.

V. Encoder State Machine

Figure 7:
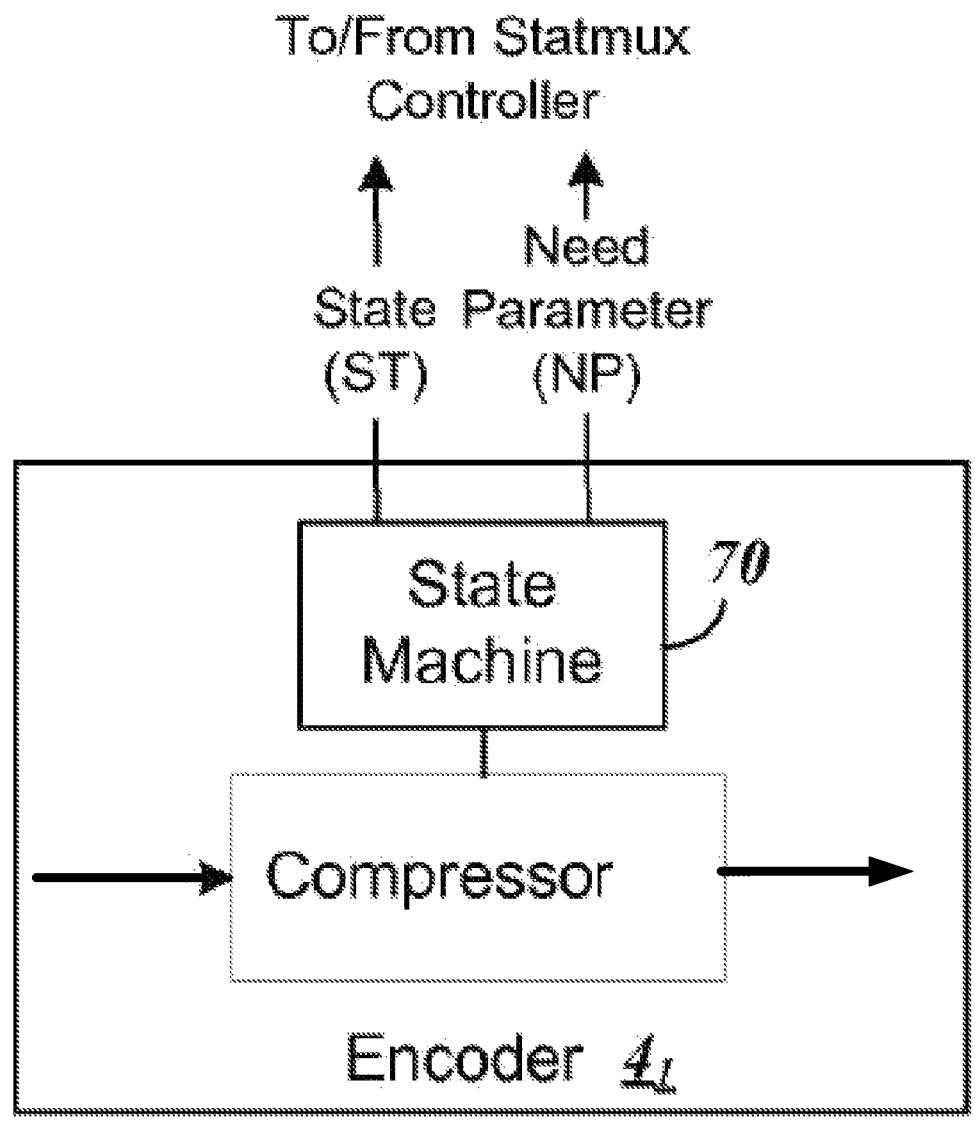
FIG. 7 illustrates a state machine included in the encoder components of FIG. 5.

FIG. 7 illustrates a state machine 70 included in the encoder $4_1$ in addition to those components of the encoder shown in FIG. 5. The state machine 70 can set the transmission stream (TS) bit rate for each compressor output from an encoder. The state machine 70 can receive the ST information from the statmux controller 6 over a PCI bus in order to set the output bit rate. The state machine can also provide the NP to the statmux controller over the PCI bus. In some encoder embodiments, an encoder comprises a single compressor, as shown in FIG. 2, and can comprise a single state machine for the controller similar to that shown in FIG. 7. In some encoder embodiments such as a HD encoder that includes multiple compressors as shown in FIG. 3, the state machine can be hosted by the MCC and/or operate in or as a separate device that communicates with the MCC.

Figure 8:
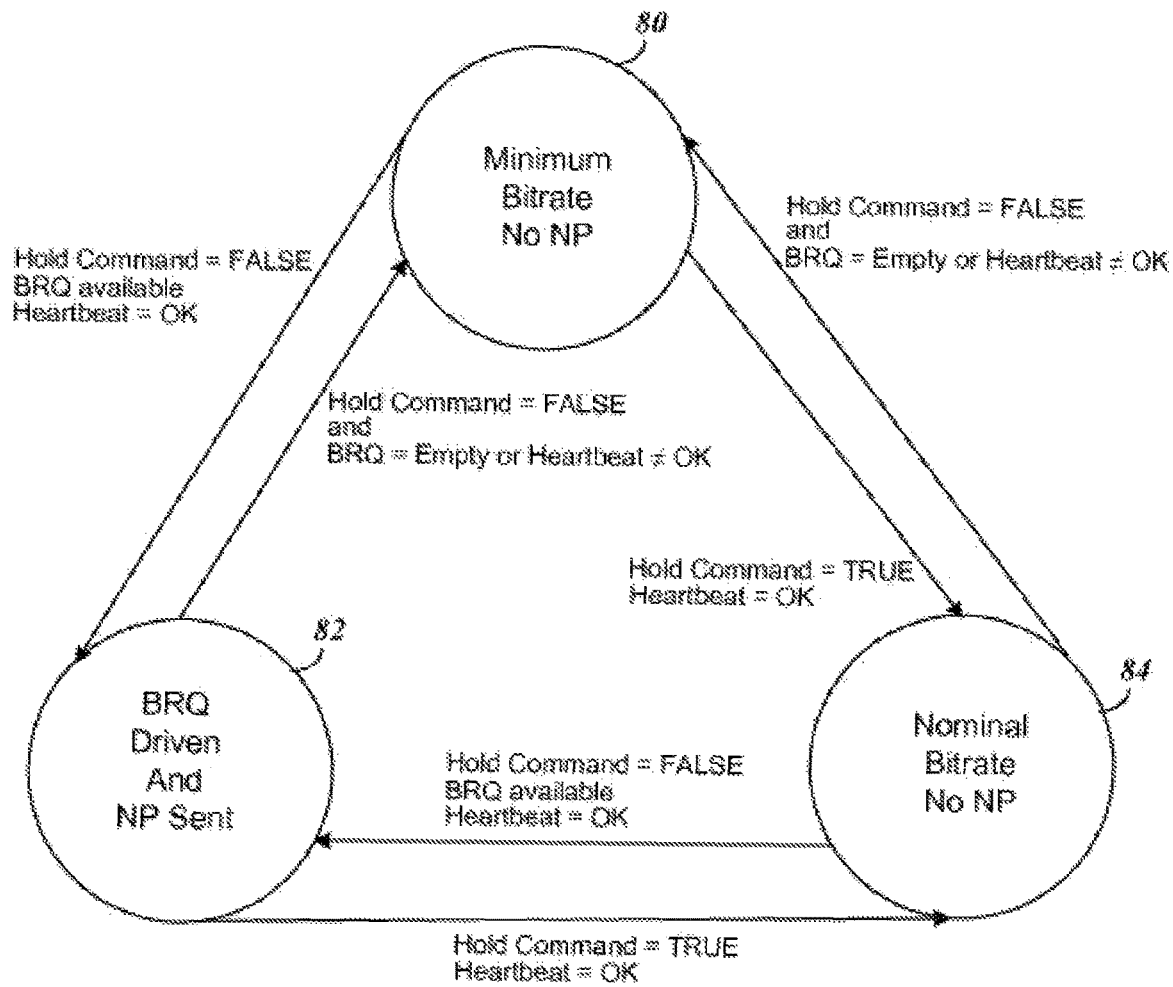
FIG. 8 shows a flow diagram for the state machine of FIG. 7.

FIG. 8 shows a flow diagram embodiment for the state machine 70. The state machine function illustrated in FIG. 8 has three states 80, 82 and 84. The first state 80 is a "Minimum Bitrate no NP" data state. In this first state 80, which occurs at startup, the state machine controls the encoder to operate at a minimum bitrate while it waits for the statmux controller to start sending bitrates. The encoder state machine does not send NP data during this first state 80. The encoder state machine does not send data (or speak) until it is spoken to. This ensures that the statmux controller is ready to receive PCI traffic. The encoder returns to this minimum bitrate state 80 if for any reason the encoder is no longer healthy (heartbeat≠OK) and is hence waiting for a reboot.

The second state 82 is the "Bitrate Queue (BRQ) Driven and Need Parameter (NP) Sent" state. In state 82, the encoder state machine transitions to the BRQ driven state and starts sending NP data to the controller once the encoder starts receiving bitrates. The encoder only sends NP data to the statmux controller when it is receiving BRQ data.

The third and final state 84 is the "Nominal Bitrate No NP" state. This nominal bitrate no NP state 84 is entered when a Hold command is sent by the statmux controller. The hold command is used when the statmux controller is ceasing to function for any reason, such as when it is recovering from a failure. In the hold state all encoders in the system are sent to a nominal bitrate while the statmux controller is rebooted. Typically, no NP data is to be sent by the encoders while the system is in this state. In order to prevent errors, the encoders can suspend transmission on the PCI bus while the controller is recovering.

Appendix A shows an example of C++ code used for allocation of bitrates to individual encoders by the statmux controller. Initially in the code a total bits to allocate variable (bits_to_allocate) is set and the NP is initialized to zero. The remaining code causes the statmux controller to allocate bits for each time slot (e.g. every 2 ms) based on the current NP value for each encoder.

Under the heading "Compute the total NP and assign a minBitrate to all channels" the code of Appendix A computes the total NP from the values provided by the encoders and then assigns a minimum bit rate to each channel formed by the output at each encoder. Each encoder first receives its minimum bitrate allocation of bits for the next available time slot after the time slot being processed.

Next under the headings "Allocate remaining bits based on complexity" and "Looping to handle case where channels hit max bitrate," the remaining bits available (of the original total) are allocated to each of the encoders in a linear mapping based on the NP received from that individual encoder. If an encoder then receives more bits than the maximum bitrate for that encoder, those bits are then given to the other encoders in a second iteration of the linear mapping.

VI. Need Parameter Modifications

Embodiments of the present invention provide for an improved determination of NP. The embodiments described take into account factors such as scene changes, and difficult frames that are identified in the video data provided for encoding.

A. Scene Change

After determining that a scene change occurrence, the coded ratios stored in an encoder may not provide accurate determination for complexity that is provided as part of the NP data for the statmux controller. In other embodiments, when determining a complexity the encoder looked only at the current picture and previous picture history. If a new scene is significantly more complex and requires a higher bit rate, the data complexity determination based only on current or previous data may not be adequate.

Discussion of a complexity determination will be made with respect to Appendix B, which includes C++ program code. The code of Appendix B is provided as an example to accomplish detection of a scene change and provide statistical information for the NP to enable controlling bit rate for an encoder. Also, reference will be made to FIG. 9 which provides a flow chart showing steps for determining complexity values for the NP to be provided from an encoder when a scene change is detected.

Figure 9:
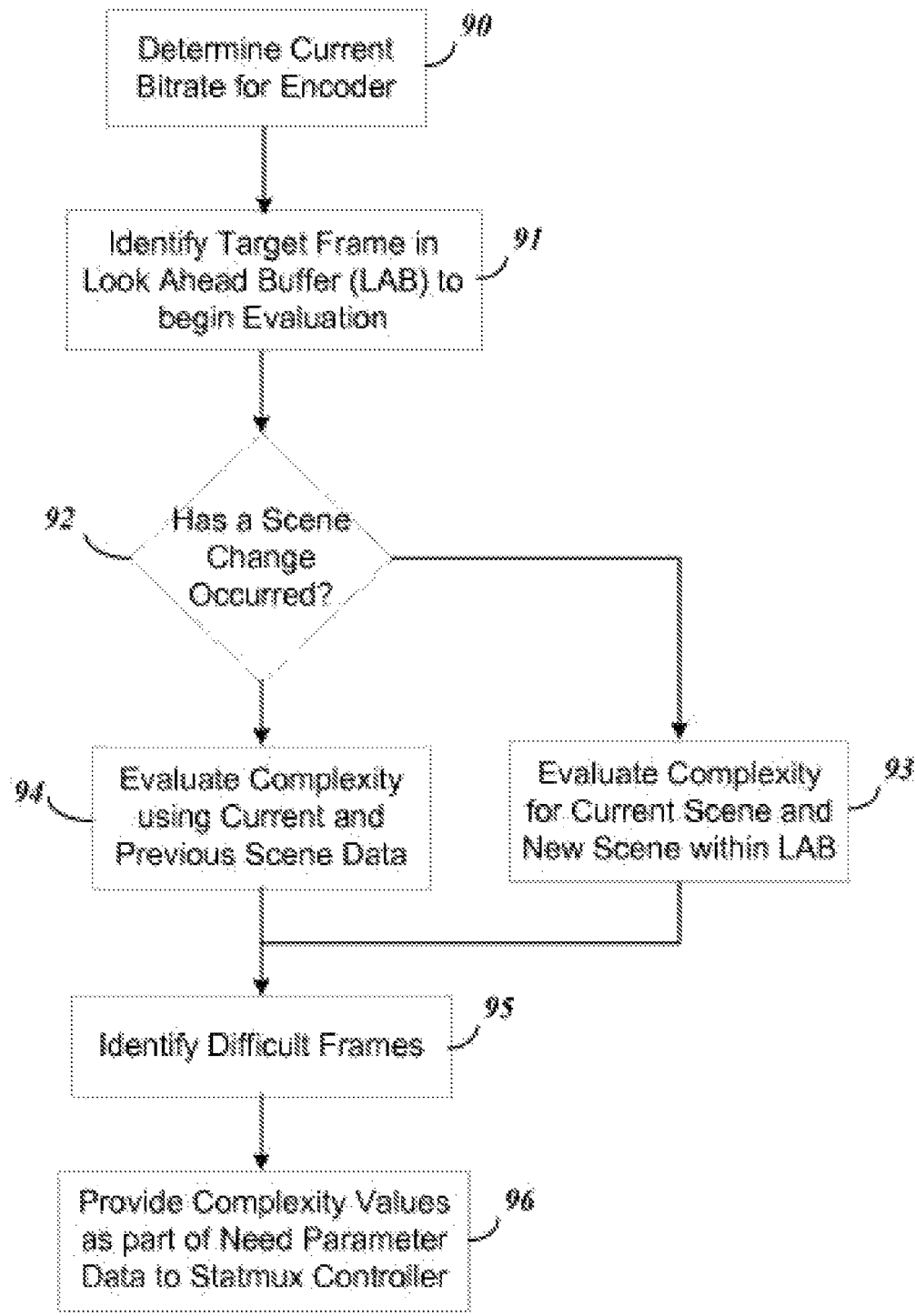
FIG. 9 provides a flow chart showing steps for determining complexity values used to provide a need parameter from an encoder when a scene change occurs.

First in part A of the code of Appendix B and in step 90 of FIG. 9, initial calculations are made to identify parameters for the current bit rate used for the encoder, whether or not a scene change occurs. In this process, the current coded ratio is retrieved from the Rate Controller (RC) of the encoder to identify the encoder's set standard bit ratio for the current fit complexity. Further, a target Decode Time Stamp (DTS) for beginning coding of future frames in the LAB is determined by using the Presentation Time Stamp (PTS) of the last frame captured. The target DTS is then fine tuned to optimize for best Video Quality (VQ).

Next in the code of Appendix B and in step 91 of FIG. 9, a target frame in the LAB is identified. The target frame is selected to allow enough time lag for sending NP data to the statmux controller and receiving bitrate control data back to control the bit rate. Several factors can affect the time lag. For example, inverse telecine data can require a significant lag from the beginning of the buffer to a target frame where obtained complexity data can be used to control bit rate. For inverse telecine, 30 frames of data can represent 38 frames, causing the encoding to significantly lag. Depending on the circumstances, the target frame can range from two or three frames in from the beginning of the buffer to ten frames or more in. The remaining size of the LAB is further determined to get an indication of the extent of the amount of data available in the LAB to measure data complexity.

Next in Appendix B and step 92 in FIG. 9, the data in the LAB is checked to determine if a scene change occurred. The data is evaluated from the target frame. If a scene change does occur, the data being evaluated to determine bit rate for the current scene may require a significantly different bit rate than the new scene after the scene change. Thus, if the scene change is detected, evaluation is made in step 93 of the new scene data as well as the current scene to determine complexity rather than relying on data only from the current scene. To ensure enough data is evaluated in the new scene to accurately determine its complexity, the data evaluated can be considered throughout the remainder of the LAB.

If a scene change is detected, data within the new scene is specifically evaluated for complexity beginning in the code of section B of Appendix B. Initially for the new scene after the scene change, a best estimate is made for the coded ratios for the new scene. To do this, the code initially looks at the I, P and B type pictures. All I pictures from a scene tend to code similarly, and the same is true for P and B type pictures. However, the I, P and B type pictures can individually code very differently, so it is important to group complexity calculations by picture type. To ensure such a grouping, the code in section B determines on average what percentage of the pictures comprise I, P and B types. These percentages are then used when determining the overall complexity.

Next, in a step of the code labeled "avgsScores, Pic_type counts, and difficult frame counts" calculations are made to determine complexity values for the current scene and the new scene using the average scores, picture type counts and difficult frame counts. Note from the code labeled "Do not include statistics from a previous scene" that only the new and current scene are evaluated. Data from the "previous scene," where the previous scene is the scene immediately preceding the current scene is not included in the complexity determination.

Finally, in the code labeled "Using the standard GOP estimate if end of scene is not found or scene is longer than N" a limitation is made on the complexity evaluation. The limitation is based in part on the size of the LAB. If the entire scene does not fit within the LAB, the complexity determination is limited by the LAB size. Further if the length of the scene is longer than N, the maximum data that can be determined and provided to the statmux controller for the bit rate statistical analysis, N serves as a limiting factor on the total complexity analysis.

The code in step C of Appendix B and in step 94 of FIG. 9, determines complexity values if no scene change is detected. In this code section, first a group of pictures (GOP) pattern is determined from the scene. Then the average scores from previous frames are propagated forward to the frame being evaluated to determine the complexity score for the current frame.

B. Difficult Frames

In one embodiment, the code further considers a particular class of "difficult frames." Detecting difficult frames is also illustrated at step 95 in FIG. 9. Difficult frames can occur when a picture flashes, as when an explosion occurs or color or fades in and out from a previous picture. These "difficult" frames can be bit intensive and much more complex to encode. In one embodiment of the system, the header of the difficult frame includes an identifier particularly labeling the frame as a difficult frame. This code in Appendix B used to identify and evaluate these difficult frames is provided next under heading "C" in the part labeled "Compute the number of difficult frames."

With a determination of difficult frames as well as complexity due to scene changes, the code of step D of Appendix B and step 96 of FIG. 9, determines the need parameter (NP) for a frame based on the determined complexity values. An initial temporary score for the frame is first set. Then, depending on whether the frame is an I or B type frame, the complexity values are provided to form the NP to provide to the statmux controller.

C. Stream Alignment

In circumstances described to follow, the bitrate output allocated to the encoders to a time period can be misaligned with that time period, causing the bit output to exceed a maximum that can be accepted by components downstream from the encoders supplying the multiplexer. Bits can thus be dropped or left on the floor when such misalignment occurs. Code in C++ for preventing such misalignment is provided in Appendix C. Appendix C will be referenced in conjunction with the description to follow.

In one example statmux encoder, bit rates are allocated to the encoders in 2 msec time periods. A misalignment refers to when the bitrate allocations for a given 2 msec allocation is applied in the encoders during the wrong 2 msec time period. In some current devices, the bitrate allocation can be off by as much as 30 msec. So embodiments of the present invention take steps to ensure that the misalignment will not overflow the components downstream from the encoders over that 30 msec time. The multiplexer itself generally does not limit the total bandwidth for the muxed stream, but components such as buffers downstream from the encoders do. In the case of misalignment, for the multiplexer, rather than getting a perfectly multiplexed stream of 36 mbps, it can waver to some extent when the bitrates are changing. In a perfect world with no misalignment between the streams from the encoders, no correction algorithm would be necessary.

To better understand the misalignment and how embodiments of the present invention can correct the misalignment, in a further example situation, assume four encoders are providing bits to a multiplexer. Assume a maximum of 20K bits are allocated in a 2 msec time period (referred to herein as time period 1). The four encoders are allocated bit rates for time period 1, as follows:
encoder 1: 10K
encoder 2: 5K
encoder 3: 5K
encoder 4: 0K Then in a second time 2 msec period following subsequent to the first (referred to herein as time period 2), according to a change in need, the bit rates for the four encoders are reallocated as follows:
encoder 1: 5K
encoder 2: 5K
encoder 3: 0K
encoder 4: 10K Now suppose the encoder 4 is misaligned and during time period 1 it jumps ahead to time period 2. Now the actual bit rate output during frame 1 will be as follows:
encoder 1: 10K
encoder 2: 5K
encoder 3: 5K
encoder 4: 10K The total bit rate output will then be 30K, which exceeds the 20K maximum output to the multiplier by 10K. In this case, 10K bits will be dropped.

In some embodiments, encoder misalignment can occur on occasion. In one example system with 2 msec bitrate entries, accuracy of a number of parameters at worst case was set to 5 msec (although 30 msec accuracies can be required as noted above). The 5 msec inaccuracies included the 2 msec video clock timestamp inaccuracy, a 2 msec clock smoothing of timestamps and a 1 msec ability to fix the TS delay.

As noted from the example above, there can be a significant change in bit rate from an encoder from time period to time period. For instance, encoder 4 jumped from 0K bits in frame 1 to 10K bits in frame 2. With such a significant change, when misalignment occurs, bits can be dropped. Accordingly, embodiments of the present invention limit the percentage increase of an encoder's output from time period to time period to prevent bits from being dropped when misalignment occurs.

Referring now to the code of Appendix C, a sample program is shown to limit the increase of an encoder's output from time period to time period. Initially the maximum buffer size is defined as 20K bits, following the above example where the multiplexer can receive a maximum of 20K bits in a 2 msec time period. Further, the maximum alignment error is set, here to 5 msec, also following the above example situation. Further, a sample period is set dividing the 2 msec time period selected into 90 KHz segments. Further, with a maximum number of delay cycles desired determined, an accumulator step size to evaluate bit rate increase is identified.

Next, a maximum bitrate increase is defined based on the maximum packet buffer output and the accumulator step size. In an initialization and subsequent reconfiguration steps the maximum bitrate increase is adjusted based on downstream constraints such as the number of channels. Finally, the maximum bitrate for an encoder is set as the lesser of the previous channel bitrate or the previous bitrate plus the maximum bitrate increase when an increase is indicated in the need parameter provided from the encoder.

Figure 10:
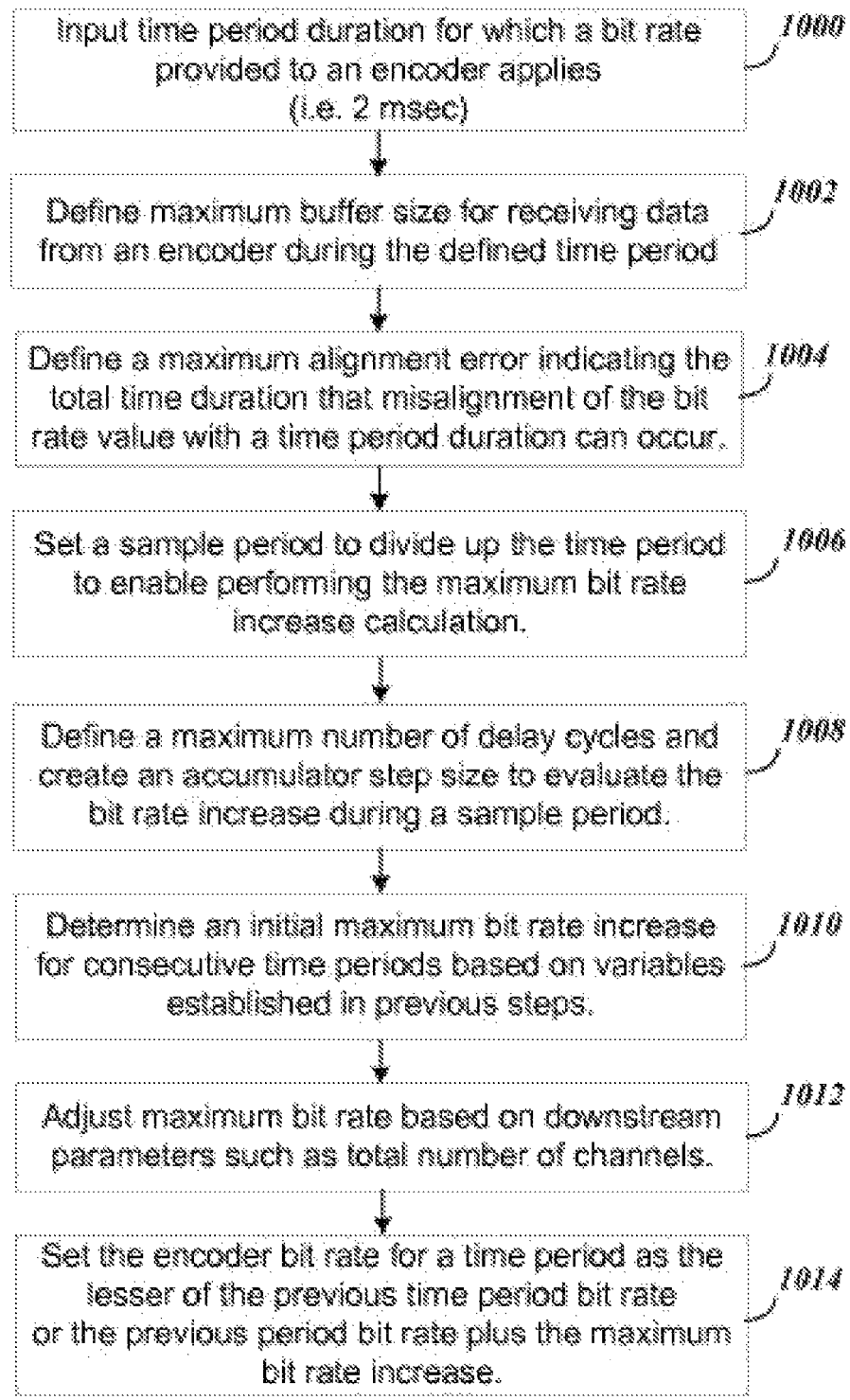
FIG. 10 provides a flow chart summarizing generally the steps to account for stream misalignment to prevent bits from being dropped.

FIG. 10 provides a flow chart summarizing generally the steps to account for stream misalignment to prevent bits from being dropped. Initially in step 1000 a time period duration that a bit rate value provided to the encoder applies is set, which may for example be 2 msec, as described above. Next in step 1002 a maximum buffer size for receiving bits from the encoders during the defined time period is determined. In step 1004 a maximum alignment error, indicating the total time duration that misalignment may occur is determined. As indicated above, this maximum alignment error may be as much 50 msec, or the length of multiple time period durations chained together.

Next in step 1006 to begin calculations to determine maximum bit rate increase, a sample period is set by dividing each time period, for example 2 msec as indicated above, into small segments. Next in 1008, a maximum number of delay cycles is determined, and an accumulator step size for evaluating bit rate increase during a sample period is created. In step 1010 the maximum bitrate increase is defined based on the maximum packet buffer output and the accumulator step size. In step 1012, the maximum bitrate increase is adjusted based on downstream constraints such as the number of channels. Finally, in step 1014 the bitrate for an encoder during a time period as the lesser of the previous time period bitrate or the previous bitrate plus the maximum bitrate increase when an increase is indicated in the need parameter provided from the encoder.

D. Film Mode

Film mode provides a special case for determining need parameter. The film mode provided for embodiments of the present invention is different from previous film mode determinations because complexity parameters are not provided based solely on the next picture provided in the LAB. Instead, the start time for the data in the LAB is determined from looking at data in the LAB.

Film mode can provide signals at 24 frames per second (fps). Non-film modes comprise SD and HD modes. An SD mode can operate at 30 fps. An HD mode corresponding to 720P can operate at 60 fps. Telecine is a process of converting film, typically having a 24 fps rate, to video that can have a different frame rate, such as 60 fps. In non-film mode, sometimes the display provides 3 time slots and other times it provides 2 time slots for display of the same film frame. Hence the term 3:2 mode can be applied for strict non-film data. Inverse telecine is a reverse process comprising detecting this 3:2 "pull-down" and converting video rate frames back to a film rate such as 24 fps. With inverse telecine, 3 time slots can be constantly generated per frame. An encoder unaware of the shift will throw away the extra time slot when 3 times slots are used in a frame. Thus in embodiments of the present invention, the frame rate is determined to indicate if the picture is in 3:2 mode or not. For example, a system can look at three seconds of data to determine if 2 or 3 time slots are being displayed per frame. If the system is using non-film mode, the system can further provide NP data to ensure that the encoder produces 60 frames per second for two time slots in HD TV mode, and not 24 frames.

When in film mode, each encoder can ensure that the need parameter (NP) sent to the statmux controller represents the fixed Decode Time Stamp (DTS) to account for the difference between the TS Delay and: 24 frames per second for film mode, 30 frames per second when in SD non-film mode; or 60 frames per second when in 720P HD non-film mode. In film mode, some embodiments of the invention can require going into the LAB in order to determine the NP, rather than using the next picture to be encoded, as in non-film mode.

Appendix D provides code for determining need parameter (NP) for film mode to account for duration for embodiments of the invention. Initially, the code determines a target DTS in the LAB by using the Presentation Time Stamp (PTS) of the last frame captured. The target DTS can be found in the LAB based on frames per second (fps) being produced to the decoder, 60 fps for HD mode, 30 fps for SD, or 24 fps for film mode. Next, the target DTS can be fine tuned for best Video Quality (VQ). Next, using the target DTS, the LAB is searched to find the target frame for determining NP complexity data. For larger frames, a variable "tmp" is set to account for the LAB length. If a first condition occurs, 2 time slots are added to tmp. If a second condition occurs, 4 timeslots are added to tmp. If a third condition occurs, tmp has a single field added. Finally, the need parameter (Needparam) is determined for providing to the statmux controller to determine a bit rate for the encoder.

Figure 11:
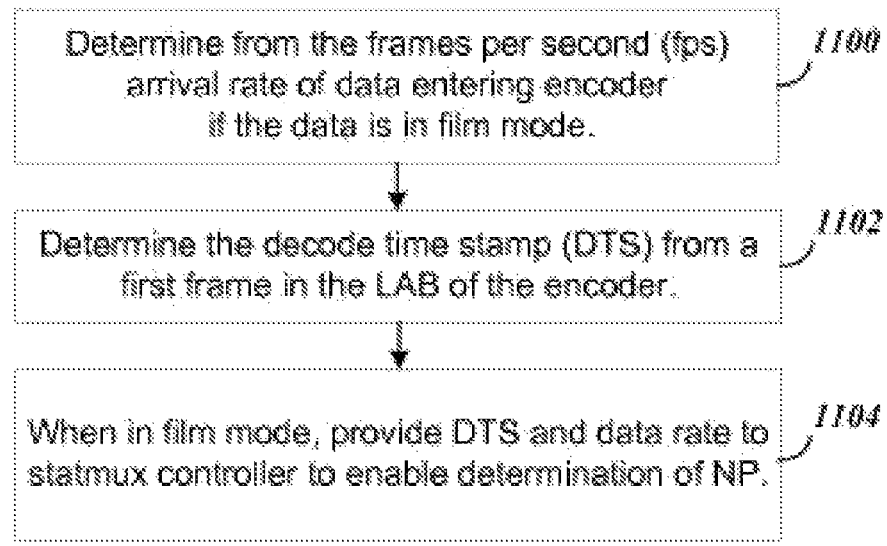
FIG. 11 provides a flowchart illustrating the steps taken for use of film mode in determining NP.

FIG. 11 provides a flowchart illustrating the steps taken for use of film mode in determining NP. First in step 1100, a determination is made of the fps data arrival rate at an encoder to determine if the data is in film mode. If data is arriving at 24 fps for film mode, the system in step 1102 can determine the DTS from a first frame in the LAB of the encoder. Finally, in step 1104, the DTS and film mode indication (or data rate) is provided to the statmux controller in order to enable determination of NP.

F. GOP Structure Changes

The GOP structure changes include determining the actual M and N values for a stream rather than using fixed values. M and N are defined as follows: N refers to the size of the GOP: number of pictures between I pictures. M refers to the size of a subGOP: number of pictures between P pictures. So in this stream: I B B P B B P B B P B B P B B P B B I, N=19 and M=3.

Previous systems used a fixed M and N as the nominal M and N for a stream. Embodiments of the present invention advantageously consider what the actual computed M and N are for the scene.

The following code illustrates the use of M and N in determining need parameter (NP). M can be recomputed on each picture. The more predictable, the larger the M factor. For still content, M can be maximized. This code advantageously uses the computed M "u8M" for the target frame as the M factor for the calculation. Some previous embodiments used a fixed M, such as 3.

```
// Determine the GOP pattern
NI = 1;
NP = (N + (frame->u8M-1))/ frame->u8M;
NB = N - NP;
NP -= NI;
```

Code for the N factor can additionally be found in Appendix B under the text heading "//Compute avgScores, pic_type counts, and difficult frame counts." In this code, the N factor is the variable N++. For a value for N++, the code calculates the number of pictures between the first two I pictures in the LAB. This value is used for N, unless it is greater than a value maxN, where maxN is a maximum calculation value provided as part of the NP to the statmux controller.

Figure 12:
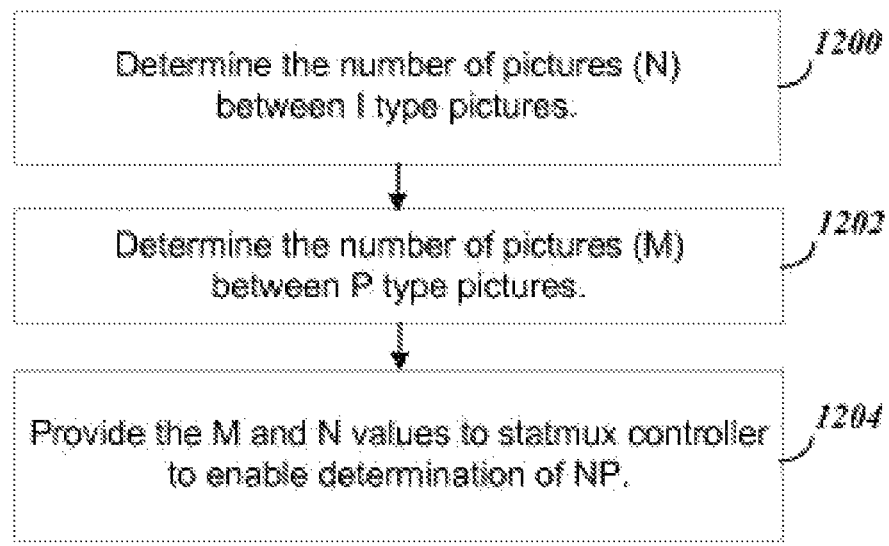
FIG. 12 provides a flowchart illustrating the steps taken to account for GOP structure changes in NP.

FIG. 12 provides a flowchart illustrating the steps taken to account for GOP structure changes in NP. First in step 1200, a determination is made of the number N of pictures between I type pictures. In step 1202, a determination is further made of the number M of pictures between P type pictures. Finally, in step 1204, the M and N values are provided to the statmux controller to enable determination of NP. Note that in alternative embodiments of the invention, a determined M or N values could be provided individually while a fixed value of the other is provided.

Figure 13:
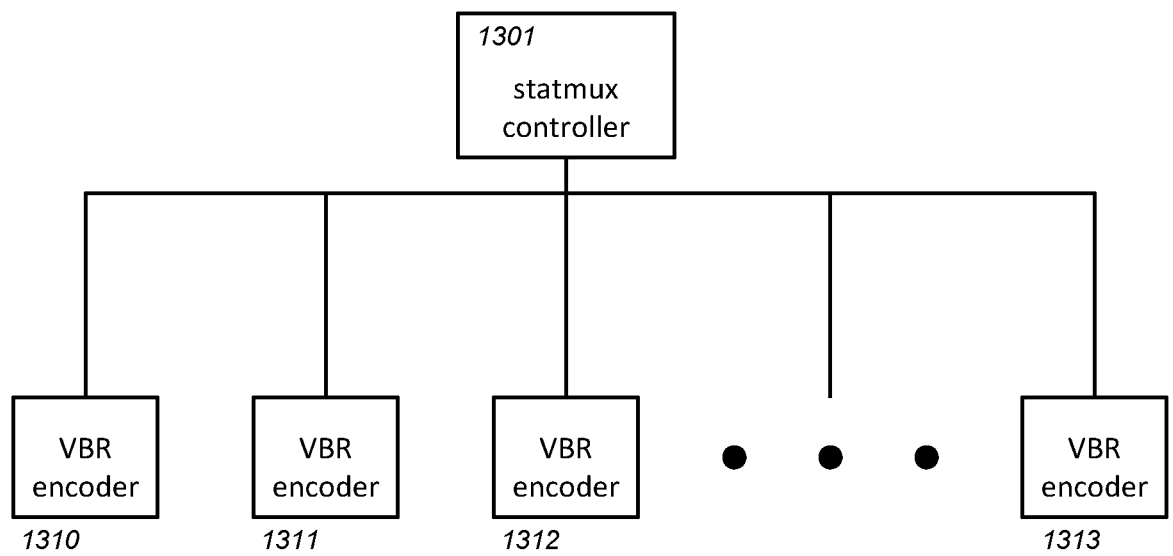
FIG. 13 depicts a block diagram of a statmux system comprising variable bit rate (VBR) encoders.

FIG. 13 depicts a block diagram of a statmux system comprising variable bit rate (VBR) encoders 1310-1313 and a statmux controller 1301. The statmux controller 1301 can interact with the one or more VBR encoders 1310-1313 such that each controller provides packetized compressed output data representative of corresponding video sources. Such video sources are also known as video data sources.

Some encoders such as Encoder 4$_1$ can be described as constant bit rate (CBR) encoders. In typical embodiments, a CBR encoder can supply packetized compressed output data at a bit rate that remains essentially constant over a large number of frames, such as video frames, of video source input. A VBR encoder can be characterized as providing the capability to controllably vary the packetized compressed output data rate between relatively small numbers of frames, such as varying the rate for every frame. Systems and methods are described herein for advantageously adapting CBR encoders such as Encoder 4$_1$ to provide capabilities of VBR encoders.

Figure 14:
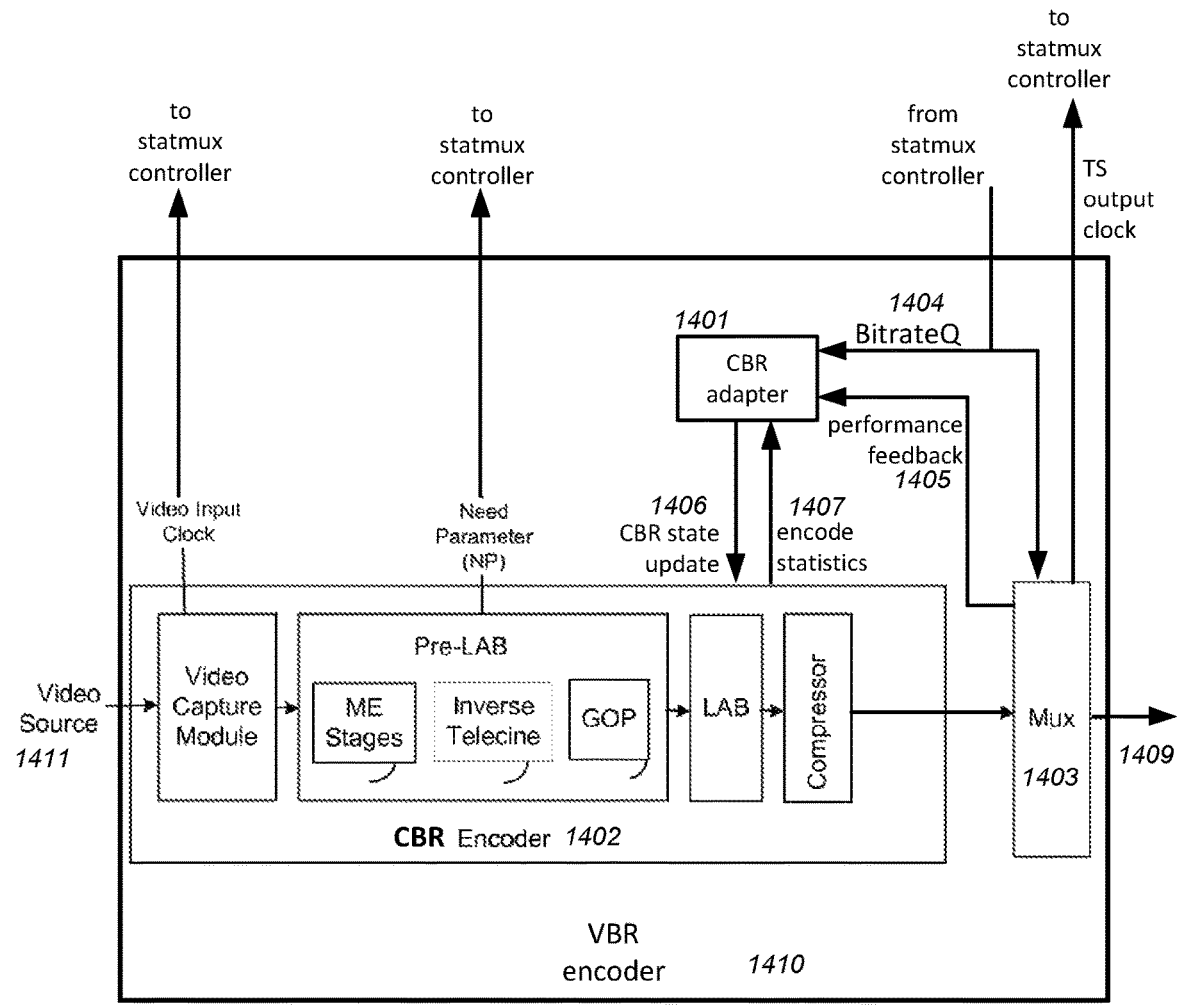
FIG. 14 depicts a block diagram of a VBR encoder within a statmux system.

FIG. 14 depicts a block diagram of a VBR encoder 1410 within a statmux system.

Constant bit rate (CBR) encoder 1402 can comprise an encoder 41 such as depicted and described herein. CBR encoder 1402 can receive a video source 1411 and provide corresponding packetized compressed output 1409 via a multiplexer 1403 as does encoder 4$_1$, depicted in FIG. 5. CBR encoder 1402 can provide a video input clock, need parameter (NP), and TS output clock to a statmux controller, as does encoder 4$_1$. VBR encoder 1410 further comprises CBR adapter 1401. CBR adapter 1401 can receive encode statistics 1407 from CBR encoder 1402, and provide CBR state update 1406 to encoder 1402. CBR adapter 1401 can receive performance feedback 1405 from Mux 1403. A VBR encoder 1410 embodiment can be described as comprising corresponding CBR encoder 1402, corresponding CBR adapter 1401, and corresponding multiplexer (mux) 1403. Further, BitrateQ 1404 specifically corresponds to VBR encoder 1410 and can be described as a corresponding bitrate queue.

A statmux controller can provide control information to CBR adapter 1401 and Mux 1403. Such control information can comprise a 'bitrate queue' that can take the form of a data structure BitrateQ 1404. BitrateQ 1404 can comprise elements including bit rate controls that can be communicated to CBR adapter 1401 and Mux 1403.

Notably, CBR adapter 1401 can provide state updates 1406 on a per-frame basis to CBR encoder 1402. CBR encoder can maintain a VBV model, a Video Buffering Verifier (VBV) model such as is well-known from MPEG standards. The VBV model maintained by and/or disposed within the CBR encoder can be referred to as a CBR VBV model. A Video Buffering Verifier (VBV) model maintained and/or disposed within the CBR adapter can be referred to as an adapter VBV model. State updates 1406 can be described as comprising VBV model corrections based on an adapter VBV model. State updates 1406 can provide VBV model corrections to the CBR encoder's 1402 VBV model on a per-frame basis, the VBR encoder 1410 system thereby adapting CBR encoder 1402 to provide functions of a VBR encoder. A state update can comprise a VBV model correction, and the VBV model correction can comprise a bit rate update such as an updated value for RC bitrate.

In some typical embodiments, a CBR encoder can operate based on some basic initial configuration, along with state information that is carried forward from frame to frame. A Video Buffering Verifier (VBV) model comprises a theoretical MPEG video buffer model. Such a model can be used to ensure that an encoded video stream can be adequately and/or correctly buffered, and played back at the decoder device.

Typical initial configuration parameters for a CBR encoder can comprise a maximum VBV buffer size, a maximum VBV delay, and an output bit rate. Each of these parameters can change in realtime for a statmux encoder. State information can comprise a model of the output stream. That model can comprise a VBV buffer location that results from placing a frame into the output stream.

In adapting CBR encoder 1402 to a VBR embodiment, a VBV model maintained by and/or within CBR encoder 1402 can be presumed invalid. Prior to the encode of each frame, CBR adapter 1401 can update the CBR encoder 1402 state and initial configuration to accurately match a valid VBV model and state corresponding to the statmux VBR encoder system. Such a CBR state update 1406 can be described as a correction to the CBR state and/or as a VBV model correction.

BitrateQ 1404 can comprise a bitrate queue data structure. This structure can comprise an NTP timestamp and number of bits (sometimes represented in bitrate) for each regular time interval scheduled by Statmux Controller 1301. In some embodiments, such time intervals can have a period in the range of 2 milliseconds (ms) to 10 ms. A Statmux Encoder can convert a network time protocol (NTP) timestamp to a video clock in the form of a program clock reference (PCR) value. This conversion can be performed outside the CBR Adapter 1401 module and provided as an input to the module. This PCR can be employed to determine when the bits and/or bitrate of BitrateQ are applied in the output stream.

Multiplexer Mux 1403 also responds to BitrateQ 1404 to allocate bits to the packetized compressed output stream 1409 based on the PCR timestamps in the BitrateQ. An operational constraint is that the Mux 1403 bit allocation can not exceed the bits allocated from the Statmux controller in the output stream. Feedback from multiplexer (Mux) 1403 can be employed to update/correct the CBR encoder state corresponding to how a particular frame's bits were actually allocated in the PCR timeline. This feedback from Mux 1403 can comprise the presentation time stamp (PTS) of the last frame placed in the output stream, and the output stream PCR of the last packet containing that frame.

Each time CBR encoder 1402 encodes a frame, it can provide encode statistics 1407 to the CBR Adapter 1401 for that frame. These statistics 1407 can comprise the PTS and the allocated bits corresponding to that frame.

In some embodiments, VBR encoder 1410 supports encoding for Advanced Video Coding (MPEG-4 AVC), also known as H.264 or MPEG-4 Part 10. In the case of such an CBR Encoder, this encode statistics 1407 can be provided twice per frame: first with an initial allocation estimate, and subsequently when a CABAC encode has completed, thereby providing a more accurate measure of bits for the frame.

Figure 15:
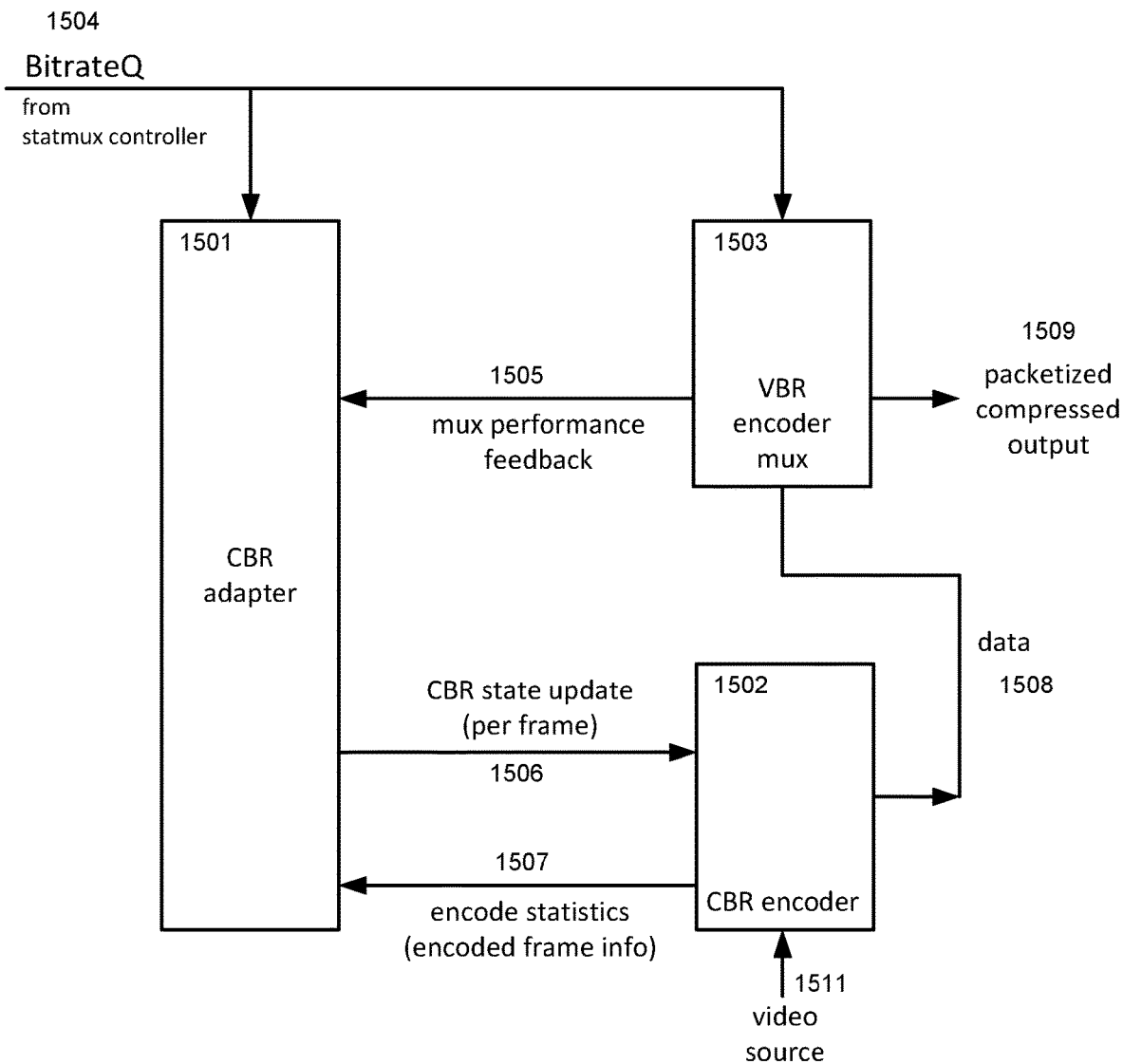
FIG. 15 depicts a block diagram of elements of a VBR encoder within a statmux system.

FIG. 15 provides an additional depiction of elements of a VBR statmux encoder as depicted and described regarding FIG. 14. The elements and interactions between CBR adapter 1501, CBR encoder 1502, VBR encoder mux 1503, BitrateQ 1504, mux performance feedback 1505, CBR state update 1506, encode statistics 1507, packetized compressed output 1509, and video source 1511 respectively correspond to FIG. 14 elements CBR adapter 1401, CBR encoder 1402, VBR encoder mux 1403, BitrateQ 1404, mux performance feedback 1405, CBR state update 1406, encode statistics 1407, packetized compressed output 1409, and video source 1411. FIG. 15 further depicts output data 1508 from the CBR encoder provided to the VBR encoder mux 1503. Video data source 1511 can comprise sequenced input frames that can be encoded by CBR encoder 1402, thereby providing output data 1508 comprising encoded output frames.

Figure 16:
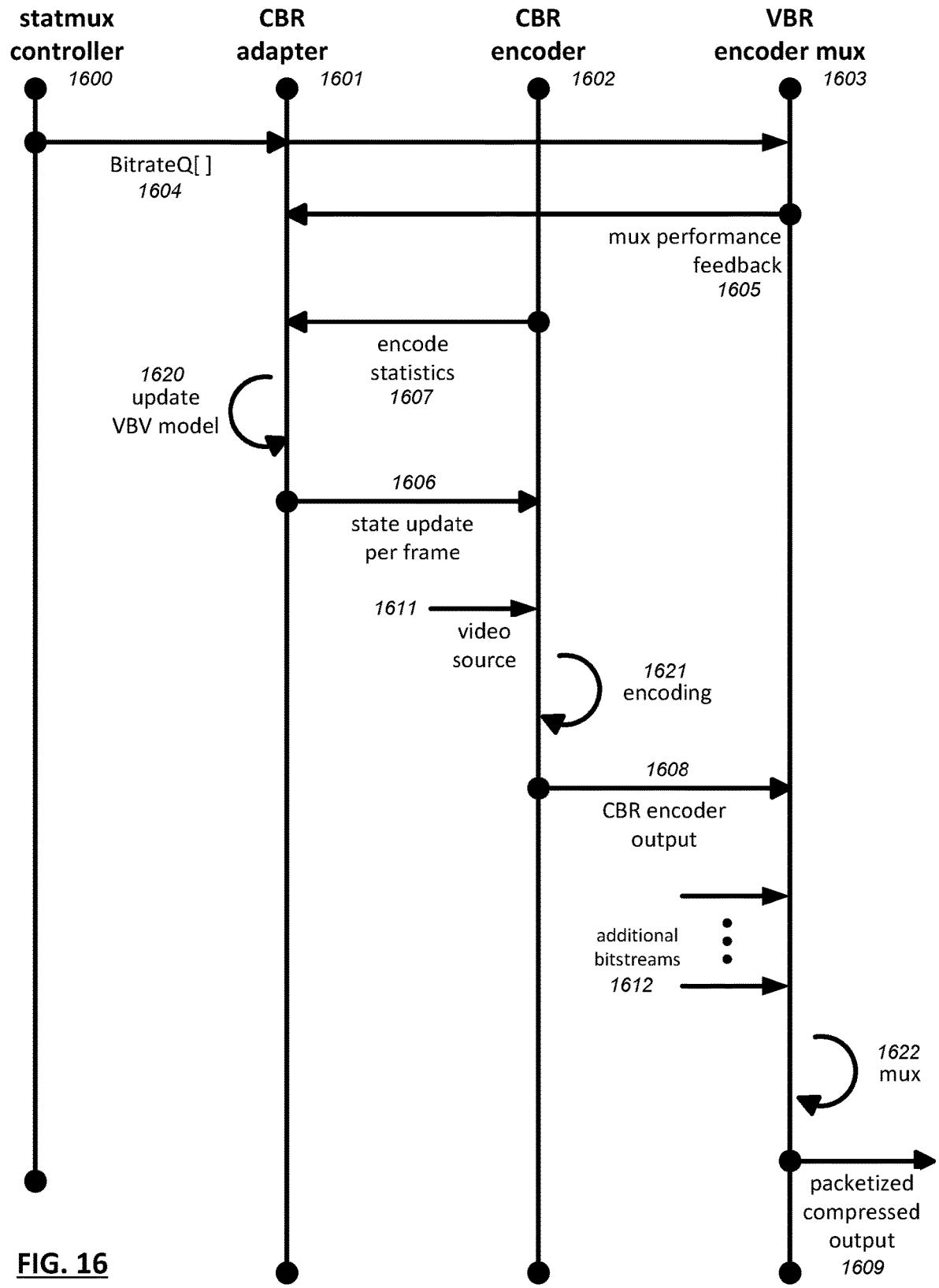
FIG. 16 depicts interactions between elements of a VBR encoder within a statmux system.

FIG. 16 depicts interactions between elements of a VBR encoder within a statmux system, such as depicted and described in regards to FIGS. 14 and 15.

Statmux controller 1600 provides BitrateQ 1604 to CBR adapter 1601 and VBR encoder mux 1603. Notably, BitrateQ can comprise a data structure comprising elements indexed according to corresponding statmux controller regular time intervals. In some embodiments such time intervals can have durations in the range of 2 ms-10 ms. Notably, at a particular moment in time, CBR adapter 1601 and VBR encoder mux 1603 can employ elements of BitrateQ corresponding to different time intervals. VBR encoder mux 1603 provides mux performance feedback 1605 to CBR adapter 1601. CBR encoder 1602 provides encode statistics 1607 to CBR adapter 1601. CBR adapter 1601 can maintain and update a VBV model 1620 responsive to the BitrateQ 1604, mux performance feedback 1605, and encode statistics 1607. In response to updates in the VBV model 1620, CBR adapter 1601 can provide a (per frame) state update 1606 to CBR encoder 1602. CBR encoder can perform encoding 1620 of a video source 1611 according to the state update 1606, and provide corresponding statistics 1607 to the CBR adapter 1601. CBR encoder output 1608 is representative of the video source 1611 input to the encoder, and is provided to the VBR encoder mux 1603. In some embodiments, additional bitstreams 1612 such as those corresponding to audio and/or metadata can also be provided to the VBR encoder mux 1603. VBR encoder mux 1603 performs multiplexing functions 1622 over the CBR encoder output 1608 and additional bitstreams 1612, thereby providing packetized compressed output 1609. Encoder mux 1603 also provides performance feedback 1605 regarding its operations to the CBR adapter 1601.

Figure 17:
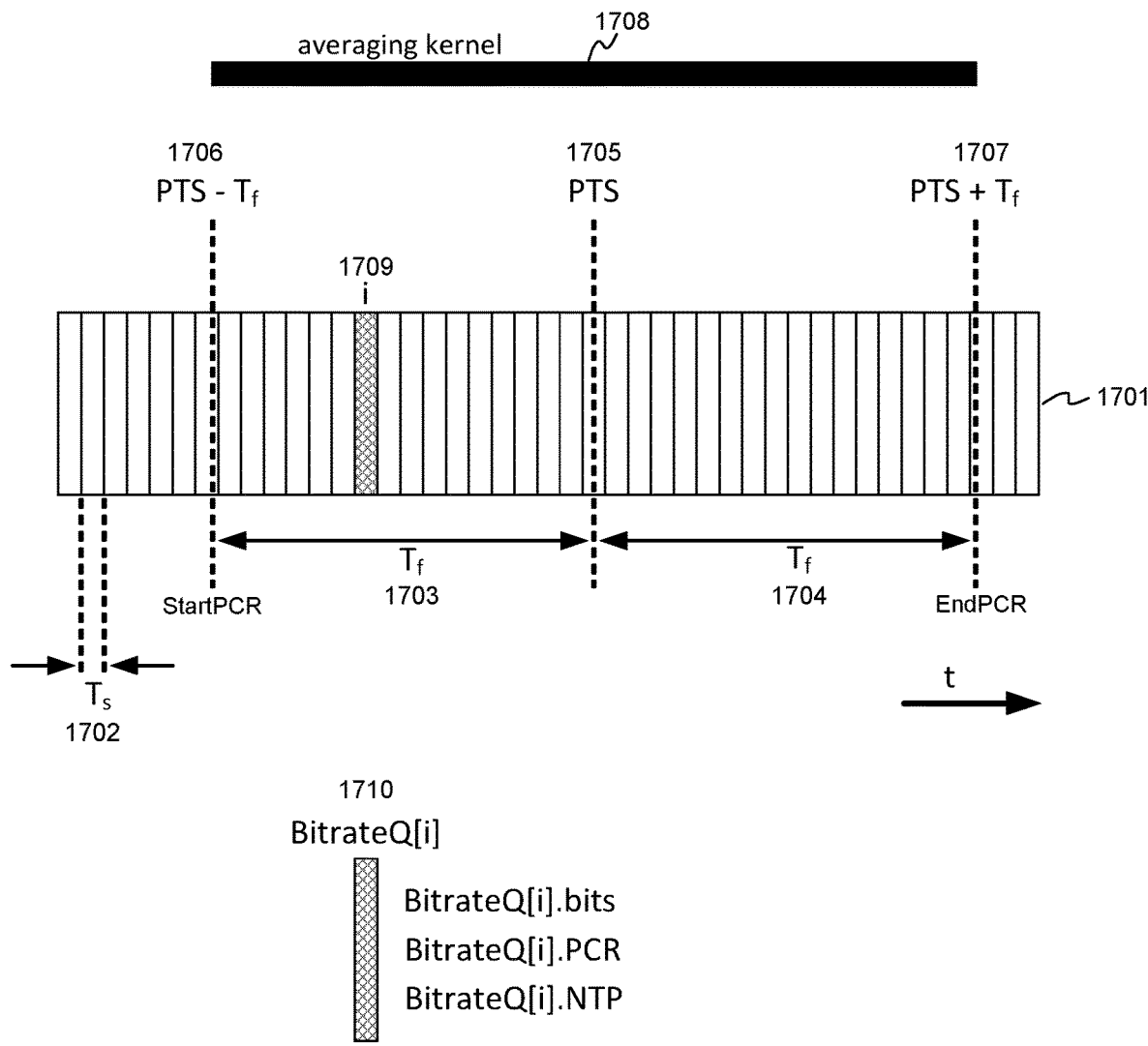
FIG. 17 depicts embodiments for providing an averaged bit rate

As part of state update 1626, CBR adapter 1601 can provide a bit rate control, that is, a bit rate update, to CBR encoder 1602. This rate can be denoted as RC bitrate. RC bitrate can be determined by evaluating an average bit rate in a sliding window around the PTS corresponding to a specific frame to be encoded. FIG. 17 depicts elements of an embodiment for determining RC bitrate.

The figure depicts a stream of successive statmux controller time intervals 1701. In some embodiments, individual statmux controller time intervals such as interval 1709, the '$i^{th}$' interval, can have a duration Ts 1702 considerably shorter than frame intervals such as Tf 1703 1704. In some typical embodiments, controller time intervals are asynchronous to frame intervals corresponding to video data sources. By way of example and not limitation, in an embodiment Ts 1702 can be 2 ms and Tf 1703 1704 can be approximately 33.33 ms, corresponding to a 30 frames per second (fps) frame rate. Statmux controller 1301 can provide elements of BitrateQ indexed according to the controller time intervals. BitrateQ[i] 1710 depicts some elements of BitrateQ corresponding to an $i^{th}$ controller time interval. Such elements can comprise "bits" "PCR" and "NTP" as indicated by BitrateQ[i].bits, BitrateQ[i].PCR, and BitrateQ[i].NTP. In some embodiments, BitrateQ[ ] can comprise additional and/or alternative elements. BitrateQ[i].bits represents a count of bits associated with the $i^{th}$ controller time interval, in other words, a bit count value. A series of BitrateQ[i].bits considered together over a span of controller time intervals can be interpreted as a bit rate. An index such as a counting index can be associated with controller time intervals, thereby providing indexed controller time intervals. BitrateQ[i].PCR represents a program clock reference (PCR) value associated with an $i^{th}$ controller time interval. BitrateQ[i].NTP represents a network time protocol (NTP) value associated with an $i^{th}$ controller time interval. In some embodiments, such BitrateQ[i].PCR and/or BitrateQ[i].NTP values can advantageously be employed to align controller time intervals to various timebases. In some embodiments, such time values can be employed to develop and/or represent bitrate queue time interval values.

The location of a PTS 1705 can be determined along a timeline of BitrateQ[ ].PCR values within the queue. An averaging kernel 1708, centered on PTS 1705, can be convolved with BitrateQ[ ].bits values to determine RC bitrate. Such an operation can be described as integrating bitrate queue bits values in a window, the window comprising controller time intervals that are proximate to the presentation time stamp PTS 1705 of a specific input frame. In some embodiments, the averaging kernel 1708 comprises a simple block average of values within a window, but the embodiments are not necessarily so limited. Alternative averaging and/or filtering techniques may be employed.

Such a window can span the time values between StartPCR and EndPCR. In some embodiments, the window begins with a StartPCR 1706 value of PTS-Tf, where Tf is a video frame interval, and the window ends with an EndPCR 1707 value of PTS+Tf. As frame boundaries and controller time intervals are generally asynchronous to each other, the time values corresponding to StartPCR and EndPCR can be described as occurring between BitrateQ[ ].PCR values that are indexed to controller time intervals. Thus in some embodiments, fractional contributions from BitrateQ[ ].bits values corresponding to edges of the window can be taken into account in the computation of RC Bitrate.

Figure 18:
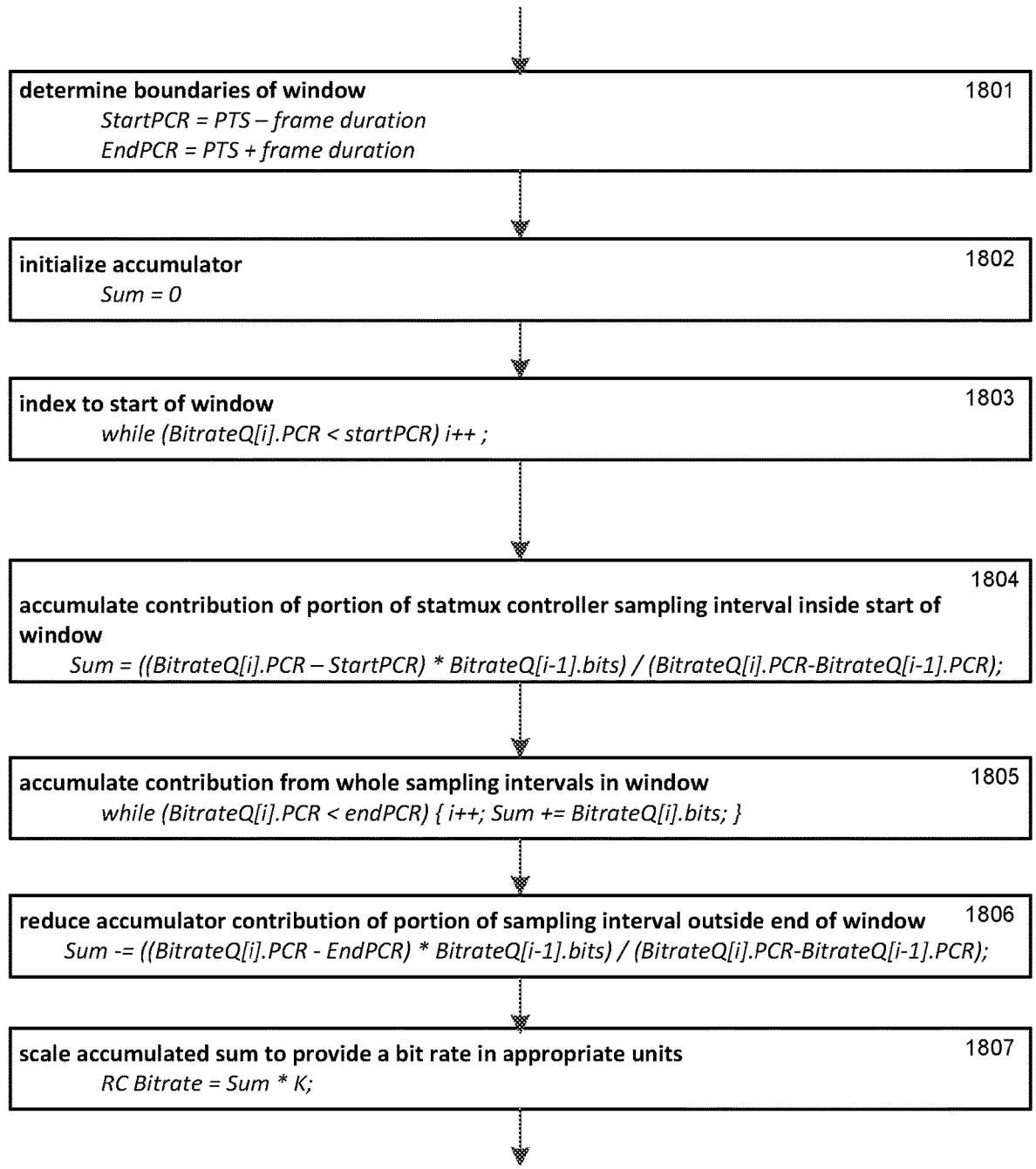
FIG. 18 depicts steps for providing an averaged bit rate

FIG. 18 depicts steps for providing RC bitrate, the averaged bit rate as depicted and described regarding FIG. 17. Each step's activity is described in boldface at the top of each step description. An exemplary C language pseudocode embodiment of the step is shown below each boldface description. Notably, pseudocode is provided to illustrate by way of examples and not limitation.

Step 1801 determines boundaries of a window, as depicted and described in FIG. 17.

Step 1802 initializes an accumulator.

Step 1803 indexes to the start of the window.

Step 1804 accumulates a contribution (from BitrateQ[ ].bits) of a portion of a controller sampling interval located just inside the start of the window.

Step 1805 accumulates contributions (from BitrateQ[ ].bits) of whole controller sampling intervals within the window.

Step 1806 reduces the accumulator contribution (from BitrateQ[ ].bits) of a portion of a controller sampling interval just outside the window.

Step 1807 scales the accumulated sum to provide a bit rate (RC bitrate) in appropriate units.

In typical CBR encoder embodiments, a maximum VBV buffer size and a maximum VBV buffer delay can be essentially constant values over a large number of frames. In contrast, in the VBR statmux encoder systems herein described, values of these parameters can be recalculated following the encoding of each frame, and provided to the CBR encoder 1602 within a per frame correcting state update 1626.

The per-frame maximum VBV buffer size and maximum VBV buffer delay values corresponding to a particular frame can be determined by a combination of user specified parameters and system performance. User-specified parameters can comprise an encoding profile. An encoding profile can provide specified limiting values of delay and buffer size. By way of example, an MPEG-2 Main Profile/High Level embodiment specifies a maximum delay (MAXUSERVBVDelay) of 1 second, and a maximum buffer size (MAX VBV SpecSize) of 7340032 bits. Depending upon operational performance, the maximum VBV buffer size or delay provided in a state update 1626 can be smaller than those limits.

In some embodiments, user-specified parameters can comprise a user specification. By way of example and not limitation, some embodiments of receiver/decoder systems can require and/or comprise a user specification that specifies limits of delay and/or buffer size.

Figure 19:
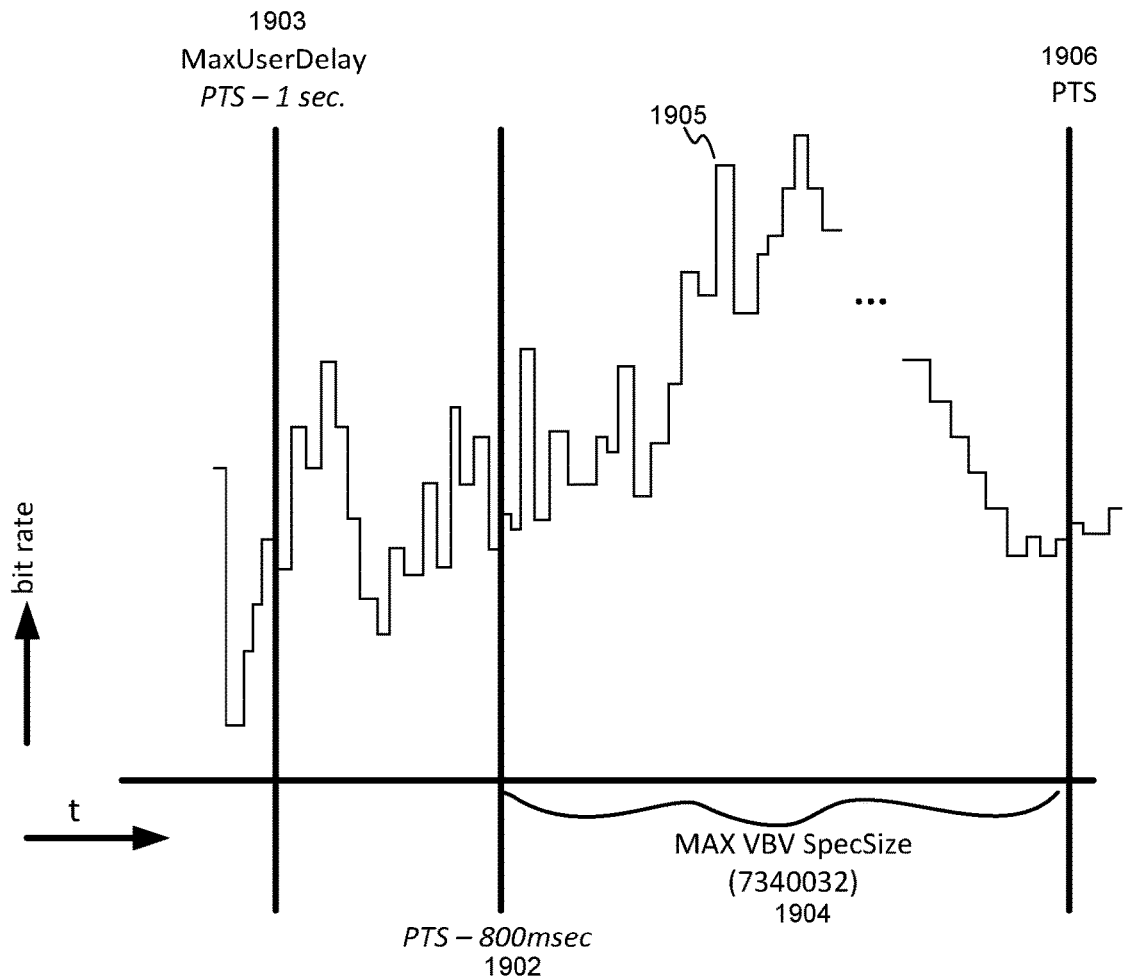
FIG. 19 depicts an embodiment for determining a maximum VBV delay and a maximum VBV buffer size.
Figure 19:
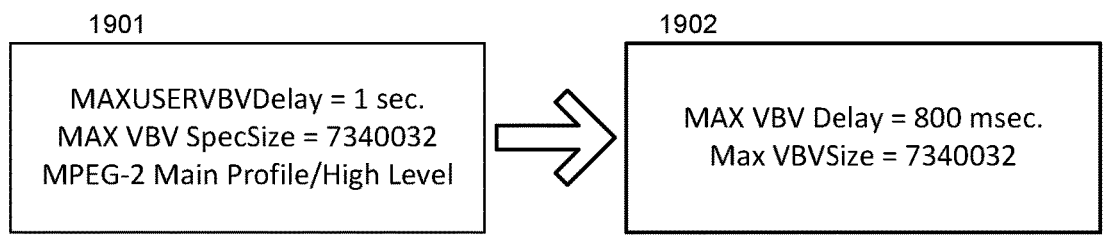

FIG. 19 depicts an embodiment in which the calculated maximum VBV buffer delay is less than the standard-specified limit.

Figure 20:
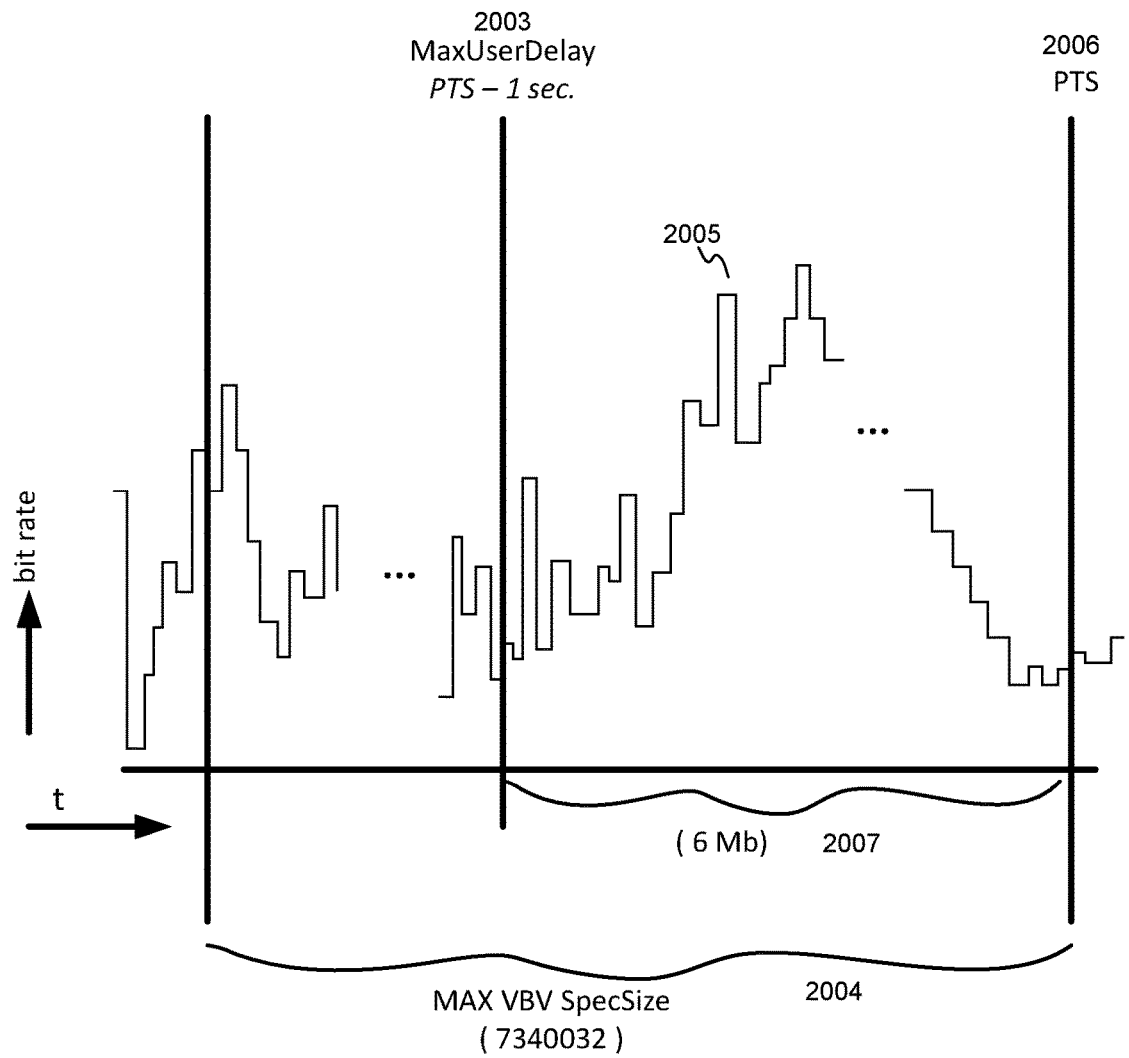
FIG. 20 depicts an embodiment for determining a maximum VBV delay and a maximum VBV buffer size.
Figure 20:
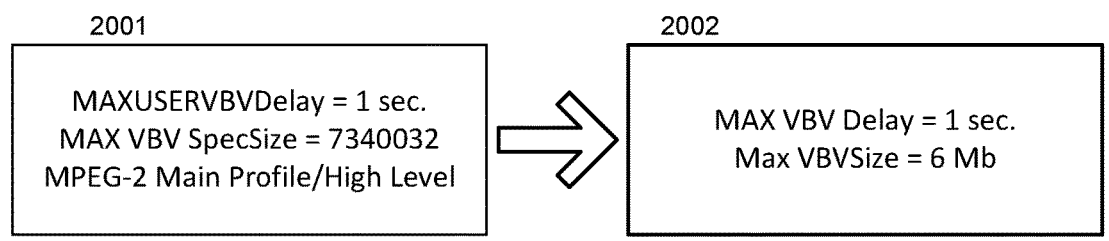

FIG. 20 depicts an embodiment in which the calculated maximum VBV buffer size is less than the standard-specified limit.

FIG. 19 depicts a graph of bit rate 1905 along a time axis spanning a current PTS 1906 to the maximum specified user delay MaxUserDelay 1903. An encoding profile 1901 MPEG-2 Main Profile/High Level provides specified limits of a maximum delay (MAXUSERVBVDelay) of 1 second, and a maximum buffer size (MAX VBV SpecSize) of 7340032 bits. The area under the bit rate 1905 curve corresponds to bits used in the VBV buffer. In this example, the area under the curve 1905 reaches the maximum specified buffer size 7340032 bits at 800 ms. Thus the maximum VBV buffer delay is constrained by the buffer size, and the reduced value of 800 ms. can be provided from the CBR adapter 1601 to the CBR encoder 1602 for a corresponding frame. In this scenario the maximum VBV buffer size can be passed along without modification. The figure depicts transformation of the profile-specified values 1901 to values for an update 1902.

FIG. 20 depicts a graph of bit rate 2005 along a time axis spanning a current PTS 2006 to well beyond the maximum specified user delay MaxUserDelay 2003. An encoding profile 1901 MPEG-2 Main Profile/High Level provides specified limits of a maximum delay (MAXUSERVBVDelay) of 1 second, and a maximum buffer size (MAX VBV SpecSize) of 7340032 bits. The area under the bit rate 1905 curve corresponds to bits used in the VBV buffer.

In this example, the area under the curve 1905 does not reach the maximum specified buffer size 7340032 bits until well beyond maximum specified user delay MaxUserDelay 2003. That span of time is depicted as 2004 and labeled as MAX VBV SpecSize (7340032). Thus the maximum VBV buffer size is constrained by the maximum buffer delay of 1 second. By way of example and not limitation, the average bit rate is depicted as 6 Mb/sec. The area under curve 2005 is thus 6 Mb, and that reduced value can be provided from the CBR adapter 1601 to the CBR encoder 1602 for a corresponding frame. In this scenario the maximum VBV buffer delay of 1 second can be passed along without modification. The figure depicts transformation of the profile-specified values 2001 to values for an update 2002.

Figure 21:
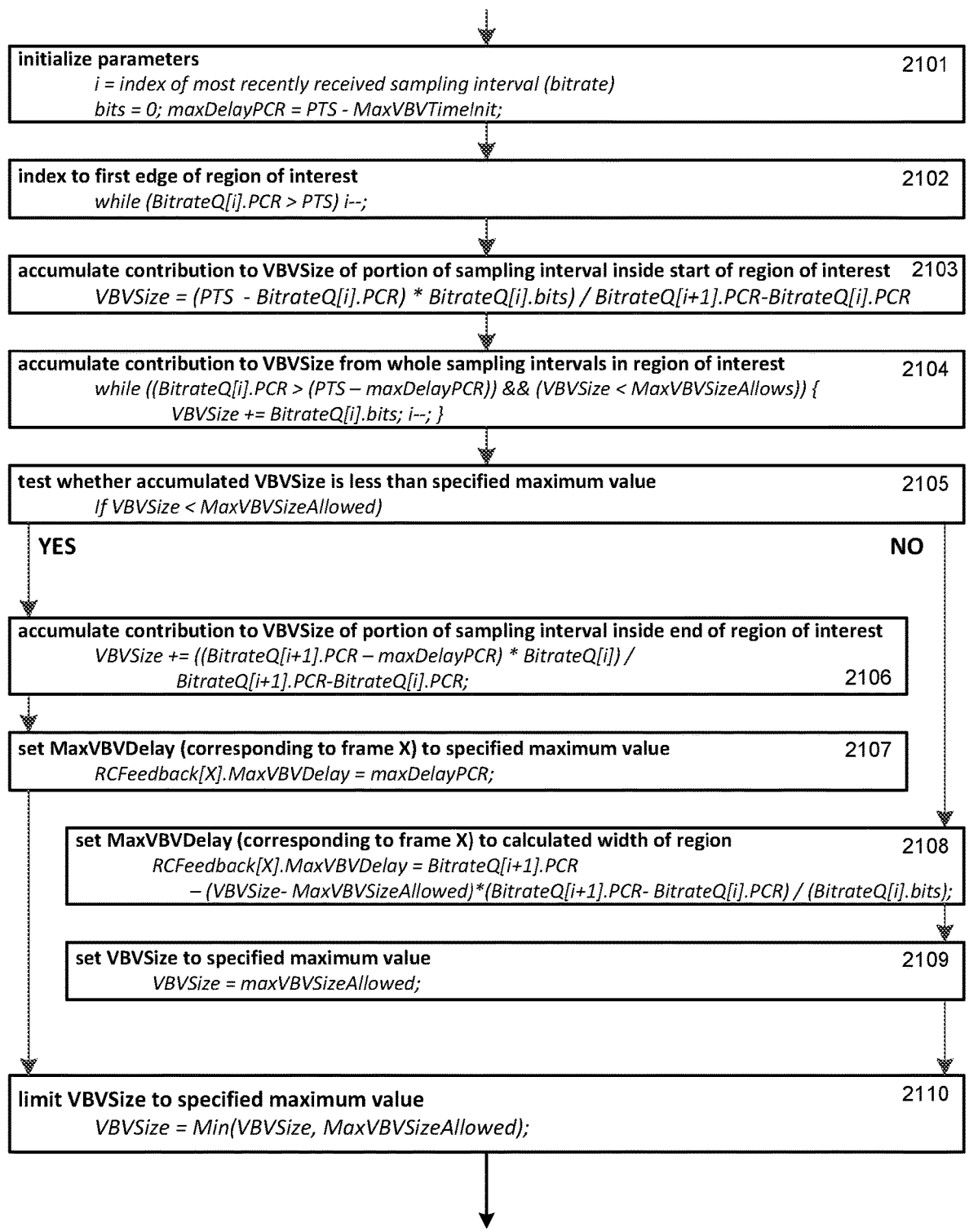
FIG. 21 depicts steps for determining a maximum VBV delay and a maximum VBV buffer size.

FIG. 21 depicts steps for determining a maximum VBV delay and a maximum VBV buffer size for a per-frame state update 1606, as depicted and described regarding FIG. 19 and FIG. 20. Each step's activity is described in boldface at the top of each step description. An exemplary C language pseudocode embodiment of the step is shown below each boldface description. Notably, the pseudocode provides illustration by way of examples and not limitation.

Step 2101 initializes parameters.

Step 2102 indexes to first edge of region of interest.

Step 2103 accumulates a contribution (from BitrateQ[ ].bits, to VBVSize) of a portion of a controller sampling interval just inside the start of the region of the interest.

Step 2104 accumulates contributions (from BitrateQ[ ].bits) from whole controller sampling intervals in the region of interest.

Step 2105 tests whether the accumulated buffer size (VBVSize) is less than the specified maximum value. If true, control flow continues at Step 2106. If false, control flow continues at step 2108.

Step 2106 accumulates a contribution (from BitrateQ[ ].bits, to VBVSize) of a portion of a controller sampling interval inside the end of the region of the interest.

Step 2107 sets the maximum delay to the specified value of the maximum delay. Control flow continues at Step 2110.

Step 2108 sets the maximum delay to the calculated width of the region.

Step 2109 sets the maximum buffer size to the specified value of the maximum buffer size.

Step 2110 limits the maximum buffer size to the specified maximum value.

Figure 22:
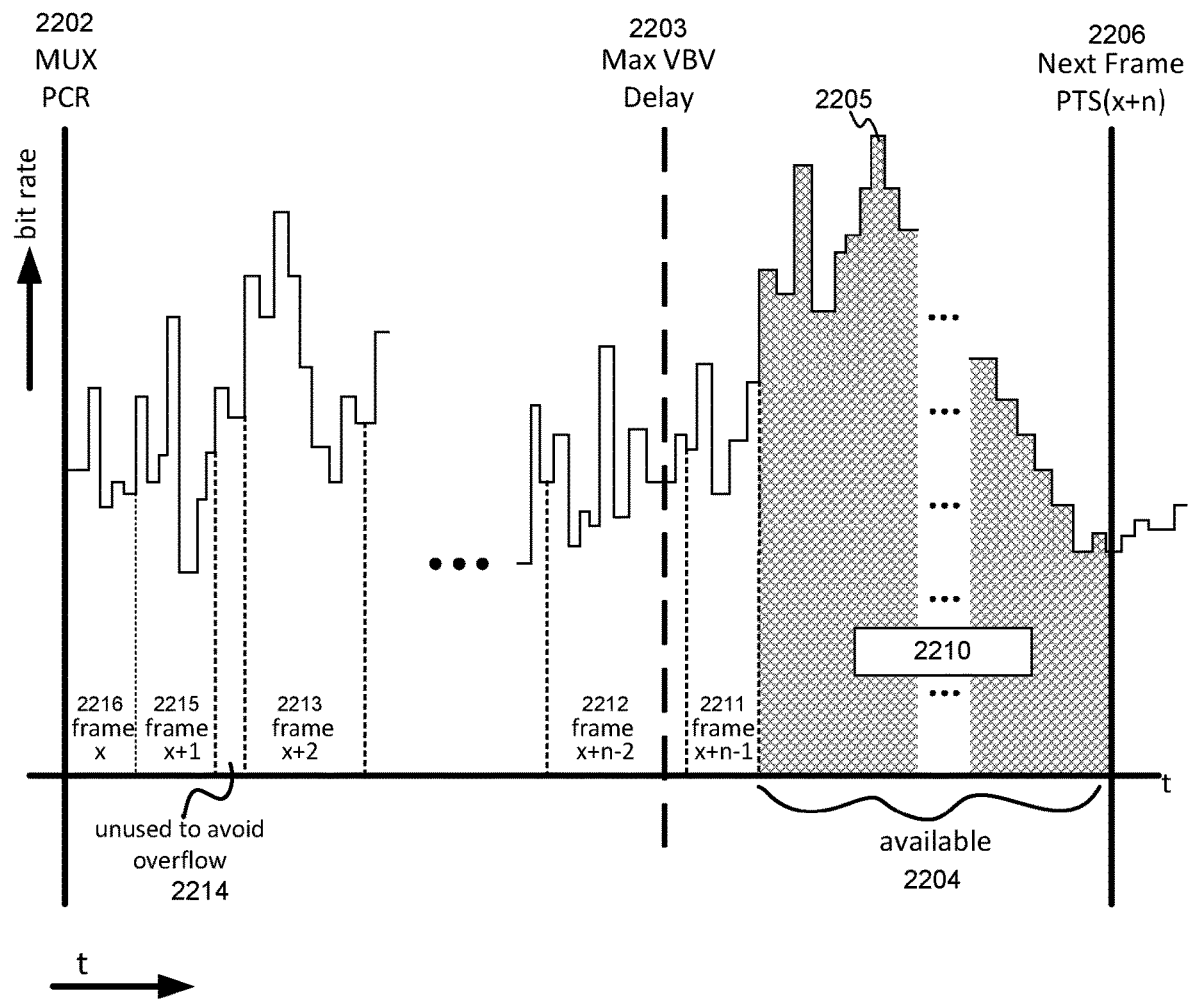
FIG. 22 depicts an embodiment for determining available VBV buffer size.

FIG. 22 depicts elements of a VBV model. CBR adapter 1601 can maintain a VBV model comprising locations of encoded frames in the VBV buffer. Through operation of this model, a count of bits available in the VBV buffer for encoding the next image can be determined. In some embodiments, encoding the next image can commence upon the availability of a sufficient number of bits in the VBV buffer. Bits available can be alternatively represented along a timeline, depicted as 'available' 2204. The bits available can also be represented and/or described as a "current vbv level" shown as area 2210 under curve 2205, representing a specific region within the VBV buffer.

MUX PCR 2202 depicts a timeline location at which the most current frame was placed in the VBR encoder mux 1603 output stream. A frame 2216 corresponding to frame index x is shown to reside at this location. Later frames 2215 (x+1), 2213 (x+2), and so on can reside further in the buffer. In some cases, the buffer can comprise unused space 2214, that can be advantageously employed to avoid overflow. Frames 2212 (x+n−2) and 2211 (x+n−1) are depicted residing further into the buffer and with respect to a location corresponding to maximum VBV delay 2203 and the PTS (presentation time stamp) 2206 of a next frame to be encoded, corresponding to a frame index of (x+n).

Area under the bit rate curve 2205 corresponds to space utilization within the VBV buffer. Space available 2210 in the VBV buffer is depicted between frame(x+n−1) and the next frame(x+n).

Figure 23:
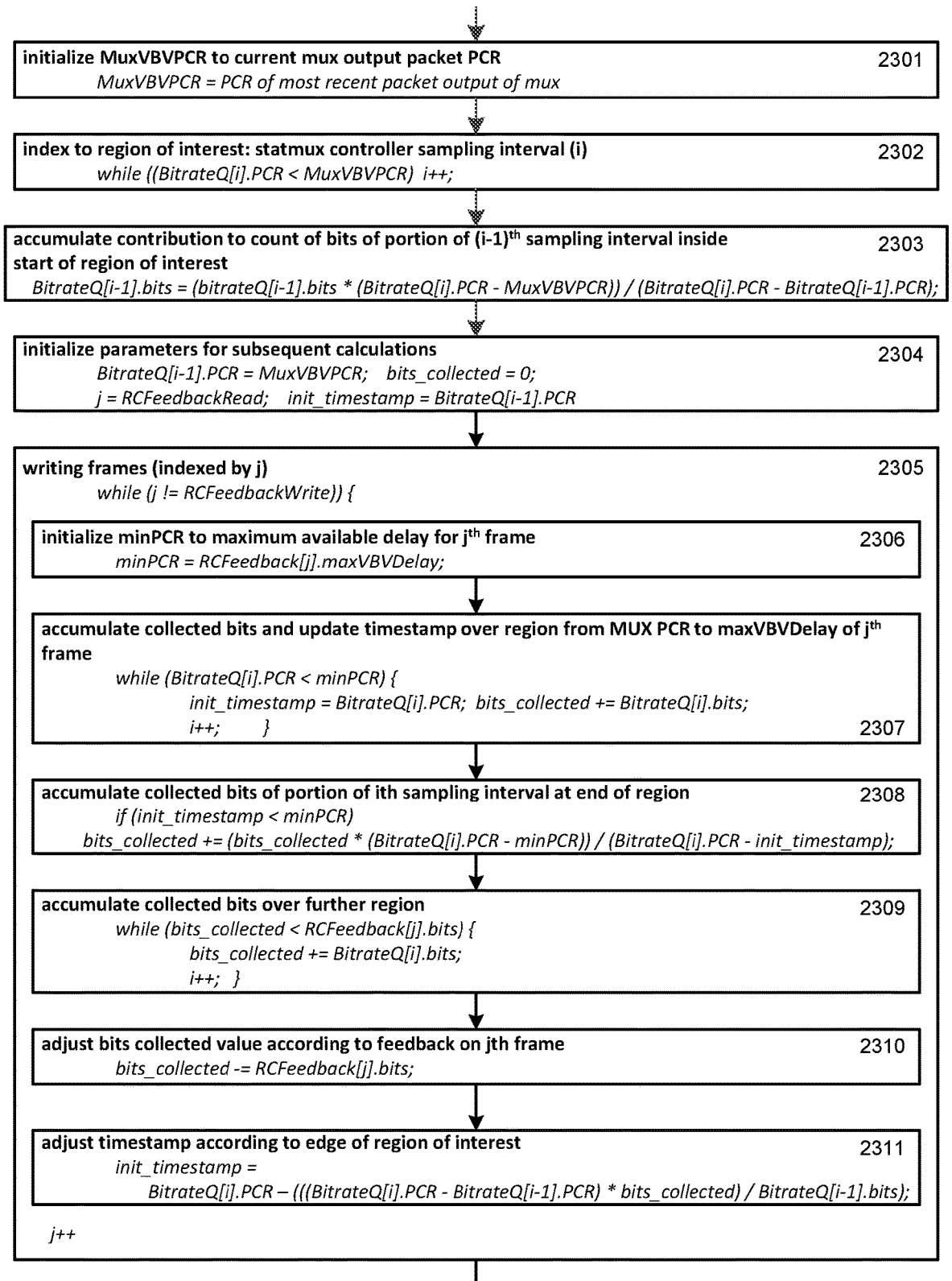
FIG. 23 depicts steps for determining available VBV buffer size.

FIG. 23 depicts steps for maintaining a model of the location of data in the VBV buffer respectively corresponding to indexed frames, as depicted and described in regard to FIG. 22. Each step's activity is described in boldface at the top of each step description. An exemplary C language pseudocode embodiment of the step is shown below each boldface description. Notably, the pseudocode provides illustration by way of examples and not limitation.

Step 2301 initializes MuxVBVPCR to current mux output packet PCR. That is, MuxVBVPCR is initialized to the PCR time location shown as MUX PCR 2202 in FIG. 22, at which the most current frame has been placed in the output stream.

Step 2302 indexes (i) through BitrateQ[i] until reaching the region of interest.

Step 2303 accumulates a contribution to a count of bits from a portion of the $(i-1)^{th}$ controller sampling interval inside the start of the region of interest.

Step 2304 initializes parameters for subsequent calculations.

Step 2305 provides a flow control loop for writing frames, indexed by j. Index j is incremented at the end of the loop.

Step 2306 initializes minPCR to a maximum available delay corresponding to the jth frame.

Step 2307 accumulates collected bits and updates a timestamp over a region from MUX PCR 2202 to maxVBVDelay 2203 corresponding to the jth frame.

Step 2308 accumulates collected bits of a portion of the $i^{th}$ controller sampling interval located at the end of the region.

Step 2309 accumulates collected bits over a further region.

Step 2310 adjusts the collected bits value according to feedback corresponding to the jth frame.

Step 2311 adjusts the timestamp according to the edge of the region of interest. Flow control returns to the top of the loop at step 2305.

Figure 24:
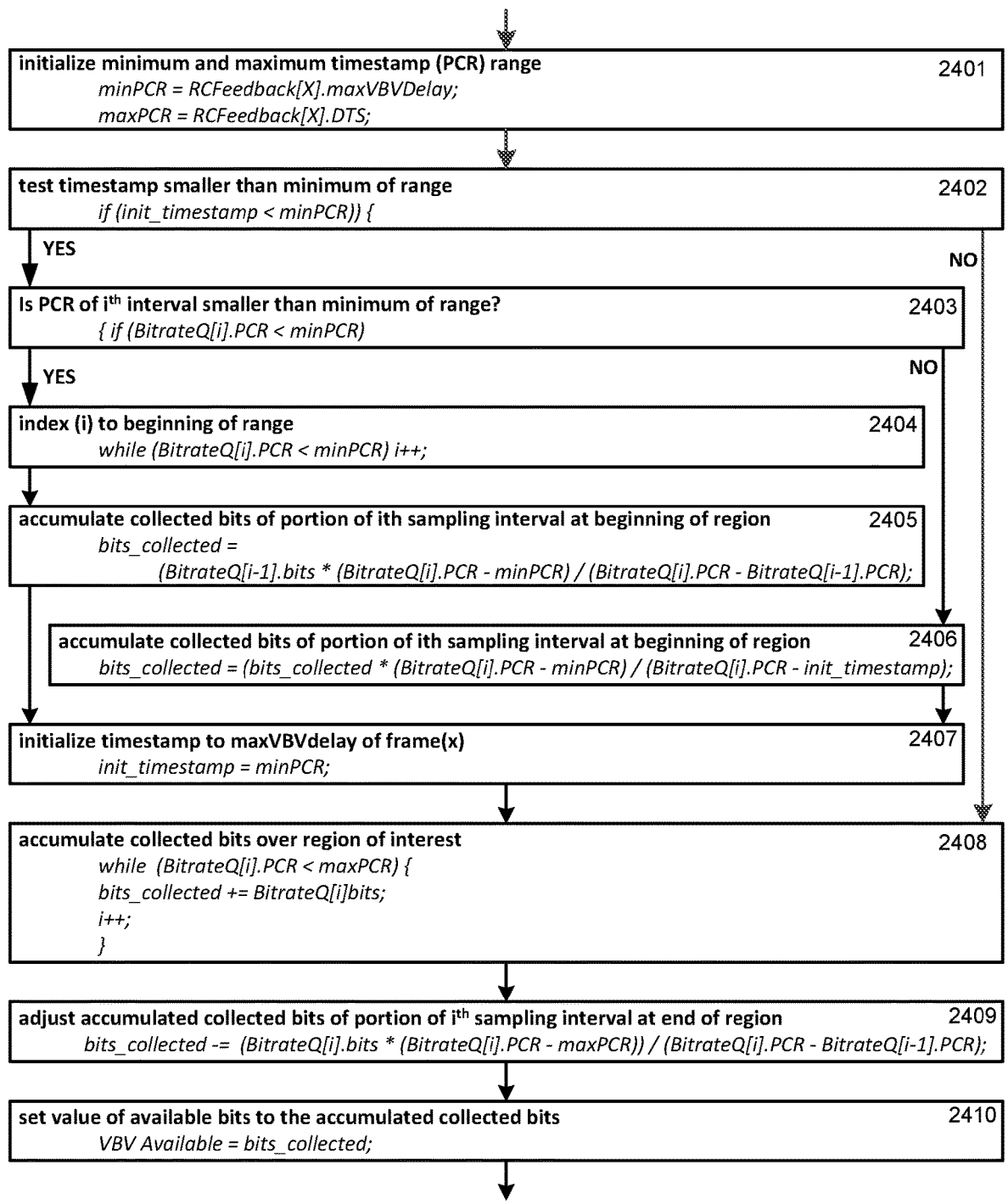
FIG. 24 depicts steps for determining available VBV buffer size.

The collected bits value and timestamp can be carried over to the steps shown in FIG. 24. FIG. 24 depicts steps for determining a count of bits available in the VBV buffer for encoding the next image, with reference to depictions and descriptions of FIGS. 22 and 23. Each step's activity is described in boldface at the top of each step description. An exemplary C language pseudocode embodiment of the step is shown below each boldface description. Notably, the pseudocode provides illustration by way of examples and not limitation.

Step 2401 initialize minimum and maximum timestamp (PCR) range

Step 2402 tests whether the timestamp is smaller than the minimum of the range. If true, flow control continues to step 2403. If false, flow control jumps to step 2408.

Step 2403 tests whether the PCR corresponding to the $i^{th}$ controller sampling interval is smaller than the minimum of range. If true, flow control continues to step 2404. If false, flow control jumps to step 2406.

Step 2404 advances index (i) until finding the beginning of the range.

Step 2405 accumulates collected bits of a portion of the $i^{th}$ sampling interval located at the beginning of range.

Step 2406 accumulates collected bits of a portion of the $i^{th}$ sampling interval located at the beginning of range.

Step 2407 initializes a timestamp to the maxVBVdelay corresponding to frame(x).

Step 2408 accumulates collected bits over the region of interest.

Step 2409 adjusts the accumulated collected bits of a portion of the $i^{th}$ sampling interval, located at the end of the region of interest.

Step 2410 sets the value of available bits to that of the accumulated collected bits.

Figure 25:
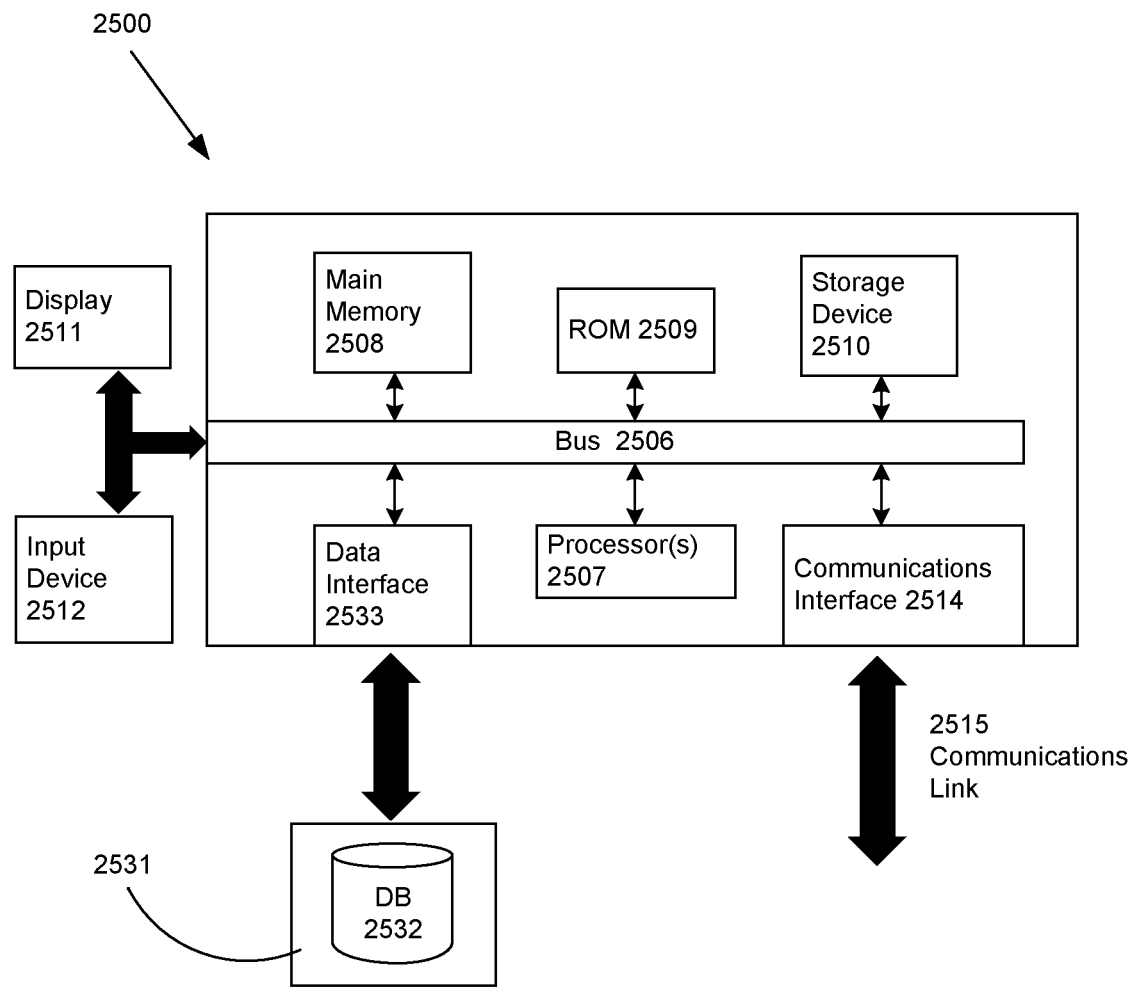
FIG. 25 depicts an exemplary computer system.

The execution of the sequences of instructions required to practice the embodiments can be performed by a computer system 2500 as shown in FIG. 25. In an embodiment, execution of the sequences of instructions is performed by a single computer system 2500. According to other embodiments, two or more computer systems 2500 coupled by a communication link 2515 can perform the sequence of instructions in coordination with one another. Although a description of only one computer system 2500 will be presented below, however, it should be understood that any number of computer systems 2500 can be employed to practice the embodiments.

A computer system 2500 according to an embodiment will now be described with reference to FIG. 25, which is a block diagram of the functional components of a computer system 2500. As used herein, the term computer system 2500 is broadly used to describe any computing device that can store and independently run one or more programs.

Each computer system 2500 can include a communication interface 2514 coupled to the bus 2506. The communication interface 2514 provides two-way communication between computer systems 2500. The communication interface 2514 of a respective computer system 2500 transmits and receives electrical, electromagnetic or optical signals, that include data streams representing various types of signal information, e.g., instructions, messages and data. A communication link 2515 links one computer system 2500 with another computer system 2500. For example, the communication link 2515 can be a LAN, in which case the communication interface 2514 can be a LAN card, or the communication link 2515 can be a PSTN, in which case the communication interface 2514 can be an integrated services digital network (ISDN) card or a modem, or the communication link 2515 can be the Internet, in which case the communication interface 2514 can be a dial-up, cable or wireless modem.

A computer system 2500 can transmit and receive messages, data, and instructions, including program, i.e., application, code, through its respective communication link 2515 and communication interface 2514. Received program code can be executed by the respective processor(s) 2507 as it is received, and/or stored in the storage device 2510, or other associated non-volatile media, for later execution.

In an embodiment, the computer system 2500 operates in conjunction with a data storage system 2531, e.g., a data storage system 2531 that contains a database 2532 that is readily accessible by the computer system 2500. The computer system 2500 communicates with the data storage system 2531 through a data interface 2533. A data interface 2533, which is coupled to the bus 2506, transmits and receives electrical, electromagnetic or optical signals, that include data streams representing various types of signal information, e.g., instructions, messages and data. In embodiments, the functions of the data interface 2533 can be performed by the communication interface 2514.

Computer system 2500 includes a bus 2506 or other communication mechanism for communicating instructions, messages and data, collectively, information, and one or more processors 2507 coupled with the bus 2506 for processing information. Computer system 2500 also includes a main memory 2508, such as a random access memory (RAM) or other dynamic storage device, coupled to the bus 2506 for storing dynamic data and instructions to be executed by the processor(s) 2507. The main memory 2508 also can be used for storing temporary data, i.e., variables, or other intermediate information during execution of instructions by the processor(s) 2507.

The computer system 2500 can further include a read only memory (ROM) 2509 or other static storage device coupled to the bus 2506 for storing static data and instructions for the processor(s) 2507. A storage device 2510, such as a magnetic disk or optical disk, can also be provided and coupled to the bus 2506 for storing data and instructions for the processor(s) 2507.

A computer system 2500 can be coupled via the bus 2506 to a display device 2511, such as, but not limited to, a cathode ray tube (CRT) or a liquid-crystal display (LCD) monitor, for displaying information to a user. An input device 2512, e.g., alphanumeric and other keys, is coupled to the bus 2506 for communicating information and command selections to the processor(s) 2507.

According to one embodiment, an individual computer system 2500 performs specific operations by their respective processor(s) 2507 executing one or more sequences of one or more instructions contained in the main memory 2508. Such instructions can be read into the main memory 2508 from another computer-usable medium, such as the ROM 2509 or the storage device 2510. Execution of the sequences of instructions contained in the main memory 2508 causes the processor(s) 2507 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 2507. Such a medium can take many forms, including, but not limited to, non-volatile, volatile and transmission media. Non-volatile media, i.e., media that can retain information in the absence of power, includes the ROM 2509, CD ROM, magnetic tape, and magnetic discs. Volatile media, i.e., media that can not retain information in the absence of power, includes the main memory 2508. Transmission media includes coaxial cables, copper wire and fiber optics, including the wires that comprise the bus 2506. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A statistical multiplexing system comprising:
   at least two variable bit rate (VBR) adapters to provide:
   a variable bit rate (VBR) video buffering verifier (VBV) Model
   at least two constant bit rate (CBR) encoders each corresponding to said at least two VBR adapters, each configured to provide:
   frame based encoding;
   a CBR video buffering verifier (VBV) Model based on a constant bit rate; and
   a CBR output stream comprising encoded CBR frames;
   where each of the at least two variable bit rate adapters and its respectively associated CBR encoder are configured to encode a different respective one of a plurality of different channels of digital television data relative to other ones of said at least two variable bit rate adapters;
   a statistical multiplexer controller configured to
   receive need parameter data from each of said at least two CBR encoders, wherein the need parameter data comprises an indication of the difficulty of content being encoded by the at least two CBR encoders, and,
   provide a bitrate queue to at least one of said at least two VBR Adapters in response to said need parameter data;
   wherein said bitrate queue comprises allocated bits and time intervals, for each of the at least two CBR encoders; and
   wherein said time intervals of said statistical multiplexer controller are asynchronous and shorter than a frame interval;
   one or more VBR multiplexers each configured to:
   receive said CBR encoded output frames;
   provide packetized compressed output of CBR frames;
   transmit said packetized compressed output of CBR frames, based at least in part on said bitrate queue provided by said statistical multiplexer controller; and
   provide performance per frame data to one of said at least two VBR Adapters;

wherein each of said at least two CBR encoders is further adapted and configured to:
encode frames of a video data source to provide said CBR output stream;
receive CBR VBV model correction data between encoding operations;
receive a CBR bitrate update between encoding operations;
provide statistical data corresponding to each encoded CBR frame, wherein the statistical data is generated by each respective one CBR encoder of said one or more CBR encoders when the respective CBR encoder encodes a frame of the content;
wherein each of said at least two VBR adapters is adapted and configured to:
receive said bitrate queue from said statistical multiplexer controller;
receive performance data from said corresponding one of said one or more VBR multiplexers;
receive statistical data from said corresponding one of said at least two CBR encoders;
provide said VBR VBV Model in response to said bitrate queue, said performance per frame data, and said statistical data corresponding to each encoded CBR frame;
provide said corresponding one of said at least two CBR encoders with said CBR VBV model correction data; and
provide said corresponding one of said at least two CBR encoders with updated CBR bit rate.

2. The system of claim 1 wherein
said statistical data comprise a presentation time stamp and a measure of bits used for each encoded CBR frame.

3. The system of claim 1 further comprising:
a CBR adapter adapted and configured to compute a bit rate for each input frame;
wherein the bit rate for each input frame is computed by integrating bitrate queue bits values corresponding to controller time intervals proximate to a presentation time stamp corresponding to the input frame.

4. The system of claim 1 further comprising:
a CBR adapter adapted and configured to
update the VBR VBV model for the encoding of each input frame, and,
provide a model correction for the CBR VBV model responsive to at least the updated VBR VBV model.

5. The system of claim 4 wherein
the VBR VBV model further comprises
a VBV buffer,
input frames disposed within the VBV buffer, and,
a corresponding maximum VBV buffer size value and a corresponding maximum VBV buffer delay value for each input frame in the VBV buffer;
wherein the maximum VBV buffer size value and the maximum VBV buffer delay value are computed from user specified parameters, a presentation time stamp corresponding to the input frame in the VBV buffer, bitrate queue time interval values, and bitrate queue bits values respectively corresponding to the bitrate queue time interval values.

6. The system of claim 5 wherein
the user specified parameters comprise a maximum buffer size and a maximum buffer delay, both corresponding to a specific encoding profile.

7. The system of claim 5 wherein
the user specified parameters comprise a maximum buffer size and a maximum buffer delay, both corresponding to a user specification.

8. The system of claim 4 wherein
the VBR VBV model further comprises
an input frame buffer,
input frames disposed within the input frame buffer,
a current vbv level,
an output buffer, and,
output frames disposed within the output buffer; and,
the current VBV level represents a count of bits available in the output buffer at a time just prior to encoding a next frame from the input frame buffer; and,
the current VBV level is computed from performance feedback corresponding to a most recently placed frame in the output buffer, encode statistics corresponding to previously encoded frames, the bitrate queue, and, a presentation time stamp corresponding to the next frame from the input frame buffer that is to be encoded.

9. A statistical multiplexing method comprising the steps of:
encoding sequenced input frames of a video data source thereby providing encoded output frames, and, need parameter data, wherein the need parameter data comprises an indication of the difficulty of content being encoded;
providing a corresponding bitrate queue responsive to the need parameter data wherein
the bitrate queue comprises indexed controller time intervals and bits values respectively corresponding to the indexed controller time intervals, and,
frame intervals corresponding to the video data source are asynchronous to, and substantially larger than, the controller time intervals;
providing packetized compressed output responsive to the encoded output frames and according to the corresponding bitrate queue;
providing performance feedback per each encoded output frame;
providing a constant bit rate (CBR) video buffering verifier (VBV) model;
receiving a state update for each input frame,
performing encoding of each input frame responsive to the state update and the CBR VBV model;
providing encode statistics corresponding to the encoding of each input frame, wherein the encode statistics are generated by at least two CBR encoders when the at least two CBR encoders encode each input frame;
where each of the at least two CBR encoders are configured to encode a different respective one of a plurality of different channels of digital television data relative to other ones of said at least two CBR encoders;
providing an adapter VBV model;
updating the adapter VBV model responsive to the corresponding bitrate queue, the performance feedback, and the encode statistics; and,
providing the state update corresponding to encoding of an input frame, the state update comprising a VBV model correction comprising a bit rate update.

10. The method of claim 9 wherein
the encode statistics comprise a PTS (presentation time stamp) and a measure of bits used for each encoded frame.

11. The method of claim 9 further comprising the steps of:
computing a bit rate for each input frame;
wherein the bit rate for each input frame is computed by integrating bitrate queue bits values corresponding to controller time intervals proximate to a presentation time stamp (PTS) corresponding to the input frame.

12. The method of claim 9 further comprising the steps of:
updating the adapter VBV model for the encoding of each input frame; and,
providing a model correction for the CBR VBV model responsive to the updated adapter VBV model.

13. The method of claim 12 wherein
the adapter VBV model further comprises
a VBV buffer,
input frames disposed within the VBV buffer, and,
a corresponding maximum VBV buffer size value and a corresponding maximum VBV buffer delay value for each input frame in the VBV buffer;
wherein the maximum VBV buffer size value and the maximum VBV buffer delay value are computed from user specified parameters, a presentation time stamp (PTS) corresponding to the input frame in the VBV buffer, bitrate queue time interval values, and bitrate queue bits values respectively corresponding to the bitrate queue time interval values.

14. The method of claim 13 wherein
the user specified parameters comprise a maximum buffer size and a maximum buffer delay, both corresponding to a specific encoding profile.

15. The method of claim 13 wherein
the user specified parameters comprise a maximum buffer size and a maximum buffer delay, both corresponding to a user specification.

16. The method of claim 12 wherein
the adapter VBV model further comprises
an input frame buffer,
input frames disposed within the input frame buffer,
a current vbv level,
an output buffer, and,
output frames disposed within the output buffer; and,
the current vbv level represents a count of bits available in the output buffer at a time just prior to encoding a next frame from the input frame buffer; and,
the current vbv level is computed from performance feedback corresponding to a most recently placed frame in the output buffer, encode statistics corresponding to previously encoded frames, the bitrate queue, and, a presentation time stamp (PTS) corresponding to the next frame from the input frame buffer that is to be encoded.

* * * * *